US012498665B2

(12) United States Patent
Nieda

(10) Patent No.: US 12,498,665 B2
(45) Date of Patent: Dec. 16, 2025

(54) ATTACHMENT STRUCTURE, ELECTRONIC DEVICE, AND IMAGE FORMING APPARATUS

(71) Applicant: Hiroaki Nieda, Kanagawa (JP)

(72) Inventor: Hiroaki Nieda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/923,713

(22) Filed: Oct. 23, 2024

(65) Prior Publication Data

US 2025/0130525 A1 Apr. 24, 2025

(30) Foreign Application Priority Data

Oct. 24, 2023 (JP) ................................ 2023-182439
May 20, 2024 (JP) ................................ 2024-081913

(51) Int. Cl.
*G03G 21/16* (2006.01)
*G03G 21/18* (2006.01)

(52) U.S. Cl.
CPC ..... *G03G 21/1647* (2013.01); *G03G 21/1821* (2013.01); *G03G 2221/1654* (2013.01)

(58) Field of Classification Search
CPC ........... G03G 21/1647; G03G 21/1652; G03G 2221/1654; G03G 21/1821; G03G 21/1619
See application file for complete search history.

(56) References Cited

U.S. PATENT DOCUMENTS

2017/0131672 A1* 5/2017 Ozawa ............... G03G 21/1647
2017/0168446 A1 6/2017 Nieda
2017/0199490 A1 7/2017 Nieda
2017/0277102 A1* 9/2017 Takai ................. G03G 21/1647
2017/0315499 A1* 11/2017 Maeda .............. G03G 21/1647
2018/0112762 A1 4/2018 Nieda
2018/0224779 A1 8/2018 Tomita et al.
2018/0329339 A1 11/2018 Nieda
2019/0018353 A1 1/2019 Tomita et al.
2019/0243284 A1 8/2019 Nieda
2019/0243285 A1 8/2019 Nieda
(Continued)

FOREIGN PATENT DOCUMENTS

JP H07-168430 A 7/1995
JP 2001-328480 A 11/2001
(Continued)

OTHER PUBLICATIONS

U.S. Appl. No. 18/387,848, filed Nov. 7, 2023.

*Primary Examiner* — Sandra Brase
(74) *Attorney, Agent, or Firm* — XSENSUS LLP

(57) ABSTRACT

An attachment structure includes a positioning shaft of a functional expansion unit attachable to an electronic device; a lock member of the functional expansion unit; a positioning hole, into which the positioning shaft of the functional expansion unit is insertable in an attachment direction, in the electronic device; a lock-engageable part of the electronic device, the lock-engageable part engageable with the lock member; and a cover to cover the positioning shaft, the positioning hole, the lock member, and lock-engageable part. The cover includes a lock restricting part on an inner face thereof. The lock restricting part restricts movement of the lock member in an unlocking direction.

12 Claims, 12 Drawing Sheets

(56) References Cited

U.S. PATENT DOCUMENTS

| | | | |
|---|---|---|---|
| 2019/0243303 | A1 | 8/2019 | Nieda |
| 2019/0265635 | A1* | 8/2019 | Shiina ................ G03G 21/1633 |
| 2019/0286011 | A1 | 9/2019 | Nieda et al. |
| 2019/0361374 | A1 | 11/2019 | Nieda |
| 2020/0166872 | A1 | 5/2020 | Kita et al. |
| 2020/0166886 | A1 | 5/2020 | Saito et al. |
| 2021/0041805 | A1 | 2/2021 | Nieda et al. |
| 2021/0157254 | A1 | 5/2021 | Nieda |
| 2021/0157256 | A1 | 5/2021 | Nieda |
| 2021/0373486 | A1* | 12/2021 | Morita ............... G03G 21/1647 |
| 2022/0206413 | A1 | 6/2022 | Nieda et al. |
| 2024/0160125 | A1 | 5/2024 | Suzuki et al. |
| 2024/0171690 | A1 | 5/2024 | Kaneda et al. |

FOREIGN PATENT DOCUMENTS

| | | | |
|---|---|---|---|
| JP | 2006-235189 | A | 9/2006 |
| JP | 2010-250699 | A | 11/2010 |
| JP | 2017-054456 | A | 3/2017 |
| JP | 2017-116988 | A | 6/2017 |

* cited by examiner

ATTACHMENT STRUCTURE, ELECTRONIC DEVICE, AND IMAGE FORMING APPARATUS

CROSS-REFERENCE TO RELATED APPLICATIONS

This patent application is based on and claims priority pursuant to 35 U.S.C. § 119 (a) to Japanese Patent Application No. 2023-182439, filed on Oct. 24, 2023 and Japanese Patent Application No. 2024-081913, filed on May 20, 2024, in the Japan Patent Office, the entire disclosure of which is hereby incorporated by reference herein.

BACKGROUND

Technical Field

The present disclosure relates to an attachment structure allowing a functional expansion unit to be attached to an electronic device, an electronic device, and an image forming apparatus.

Related Art

Some pieces of electronic equipment, such as image forming apparatuses, enable a functional expansion unit, such as a card reader that reads information on an integrated circuit (IC) card, to be attached as an option thereto.

For example, as an attachment structure allowing a scanner to be attached to the upper portion of a printer, disclosed is a configuration in which a guide pin provided to the bottom of a scanner is inserted into a fitting hole provided to the top face of a printer.

In addition, as a configuration, disclosed is an unlocking lever that unlocks a locked state.

For easy detachment of a functional expansion unit from electronic equipment, preferably, an externally operable unlocking lever is provided. However, in a case where such an unlocking lever is provided, for example, a user is likely to operate the unlocking lever, carelessly.

In order to solve such a disadvantage, as a configuration, preferably, a protective cover is attached to prevent the unlocking lever from being exposed. However, in a case where a force acts to detach the functional expansion unit forcedly even with such a protective cover attached, the locked state is likely to be unlocked due to displacement or deformation of a member included in a lock mechanism. On the other hand, use of fasteners, such as screws, for firmly attachment of a functional expansion unit causes, as a disadvantage, a troublesome operation for attachment or detachment of the functional expansion unit.

SUMMARY

An attachment structure includes a positioning shaft of a functional expansion unit attachable to an electronic device; a lock member of the functional expansion unit; a positioning hole, into which the positioning shaft of the functional expansion unit is insertable in an attachment direction, in the electronic device; a lock-engageable part of the electronic device, the lock-engageable part engageable with the lock member; and a cover to cover the positioning shaft, the positioning hole, the lock member, and lock-engageable part. The cover includes a lock restricting part on an inner face thereof. The lock restricting part restricts movement of the lock member in an unlocking direction.

An attachment structure includes a positioning shaft of an electronic device; a lock member of the electronic device; a positioning hole into which the positioning shaft of the electronic device is insertable in an attachment direction in a functional expansion unit attachable to an electronic device; a lock-engageable part of the functional expansion unit, the lock-engageable part engageable with the lock member; and a cover to cover the positioning shaft, the positioning hole, the lock member, and lock-engageable part. The cover includes a lock restricting part on an inner surface thereof. The lock restricting part restricts movement of the lock member in an unlocking direction.

The present disclosure enables achievement of easy attachment and detachment of a functional expansion unit and prevention of improper or unintended detachment.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
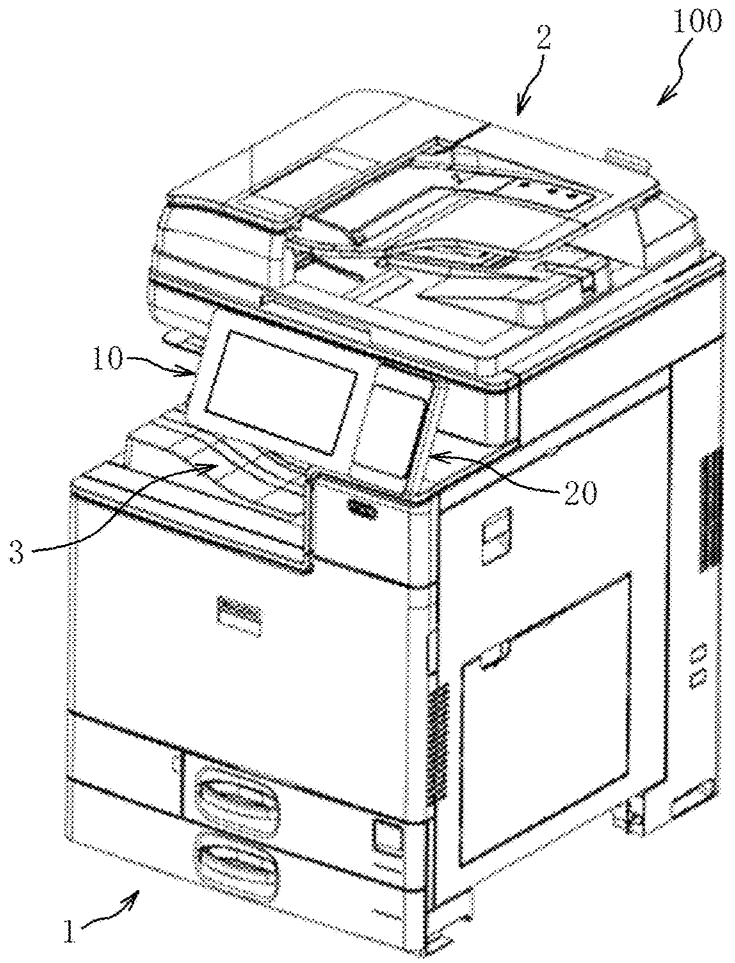
FIG. 1 is an external view of the entire configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Attachment structures according to embodiments of the present disclosure allowing a functional expansion unit to be attached to an operation panel as an exemplary electronic device in an image forming apparatus will be described below based on the accompanying drawings. Note that constituent elements, such as members or constituent components having the same functions or shapes, are denoted with the same reference signs in the drawings for use in describing the present disclosure and duplicate descriptions thereof will be omitted.

Entire Configuration of Image Forming Apparatus

FIG. 1 is an external view of the entire configuration of an image forming apparatus 100 according to an embodiment of the present disclosure.

As illustrated in FIG. 1, the image forming apparatus 100 includes a sheet feeder 1 that feeds a sheet as a recording medium, an image reader 2 that reads image information on an original, and a sheet ejector 3 that ejects a sheet on which an image is formed. The front of the image forming apparatus 100 has an upper portion provided with an operation panel 10 that is of a touch-panel type. The operation panel 10 serves as an operation section through which an operator inputs a printing command. Note that the operation panel 10 is not limited to being of such a touch-panel type and thus may be of a button type.

Figure 2:
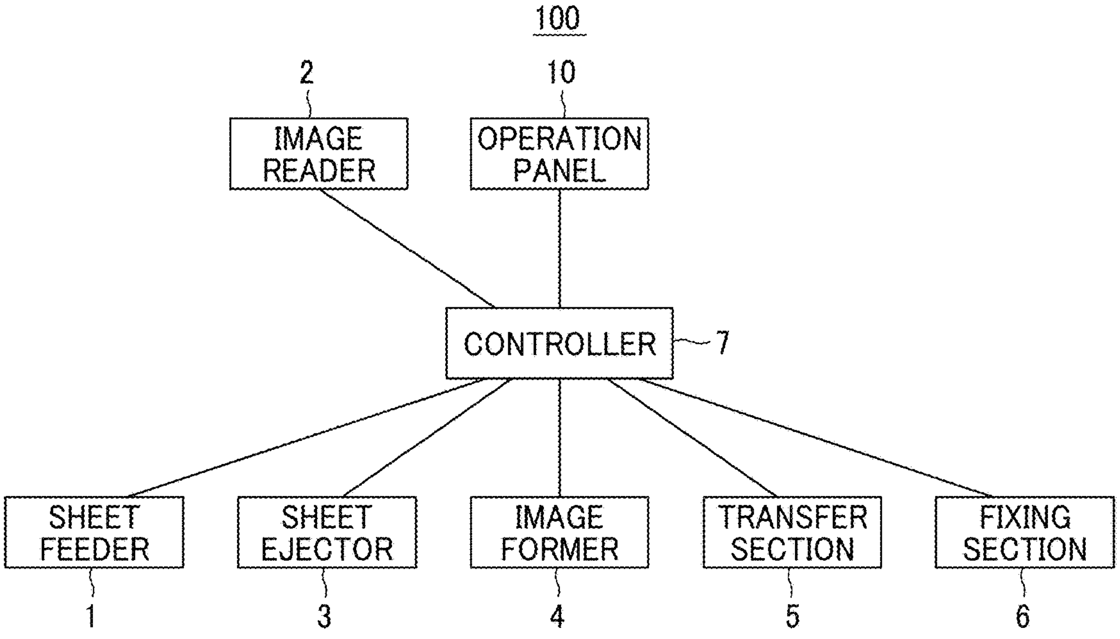
FIG. 2 is a control block diagram of the image forming apparatus according to the embodiment of the present disclosure.

FIG. 2 is a control block diagram of the image forming apparatus 100 according to the embodiment of the present disclosure.

As illustrated in FIG. 2, the image forming apparatus 100 includes an image former 4 including an image bearer that bears a toner image on its surface, a transfer section 5 that transfers the toner image to a sheet, a fixing section 6 that fixes the toner image to the sheet, and a controller 7 that controls various types of operations of the image forming apparatus 100, in addition to the sheet feeder 1, the image reader 2, and the sheet ejector 3. The controller 7 controls, for example, the operation of sheet feeding of the sheet feeder 1, the operation of sheet ejecting of the sheet ejector 3, the operation of image forming of the image former 4, the operation of transferring of the transfer section 5, and the operation of fixing of the fixing section 6. Specifically, the controller 7 is achieved by a microcomputer including a central processing unit (CPU), a read-only memory (ROM), a random-access memory (RAM), and an input/output (I/O) interface. Based on the print condition, print mode, and print command set due to an operation on the operation panel 10, the controller 7 controls the various types of operations of the sheet feeder 1, the sheet ejector 3, the image former 4, the transfer section 5, and the fixing section 6. The controller 7 generates image data from image information on the original read by the image reader 2 or from image information transmitted from a terminal device. Note that, instead of an electrophotographic image forming apparatus, an ink-jet image forming apparatus or permeographic image forming apparatus may be provided, that is, any apparatus that forms an image on a sheet may be provided.

Operation of Image Forming Apparatus

Next, the operation of the image forming apparatus 100 according to the embodiment of the present disclosure will be described.

In response to an instruction for starting printing in the image forming apparatus 100, the image reader 2 reads image information on the original, and then the controller 7 generates image data from the read image information. Then, based on the generated image data, the image former 4 starts to operate for image formation to form a toner image on the image bearer. Image data may be generated based on image information transmitted from a terminal device. An image may be not only a meaningful image, such as a character or a figure, but also an unmeaningful image, such as a pattern.

The transfer section 5 transfers, to a sheet, the toner image formed on the image bearer. The sheet corresponds to a sheet fed from the sheet feeder 1. Note that the sheet may be paper, such as plain paper, thick paper, a postcard, an envelope, thin paper, coated paper, or tracing paper, or may be an overhead projector (OHP) sheet, a plastic film, pre-preg, or copper foil. The sheet to which the toner image is transferred is conveyed to the fixing section 6. Then, the fixing section 6 fixes the toner image to the sheet. After that, the sheet is conveyed to the sheet ejector 3. Then, the sheet ejector 3 ejects the sheet outward from the image forming apparatus 100.

Functional Expansion Unit

As illustrated in FIG. 1, the image forming apparatus 100 according to the embodiment of the present disclosure enables a functional expansion unit 20 to be attached to a lateral side of the operation panel 10. The functional expansion unit 20 is, for example, a card reader that reads information, such as user identification (ID), from a user authentication card. Note that the functional expansion unit 20 to be attached to the operation panel 10 is not limited to such a card reader. For example, the functional expansion unit 20 may be an add-on unit, such as a unit provided with a numeric keypad.

Configuration of Attachment Structure

Next, an attachment structure allowing the functional expansion unit 20 to be attached to the operation panel 10 according to the embodiment of the present disclosure will be described.

Figure 3:
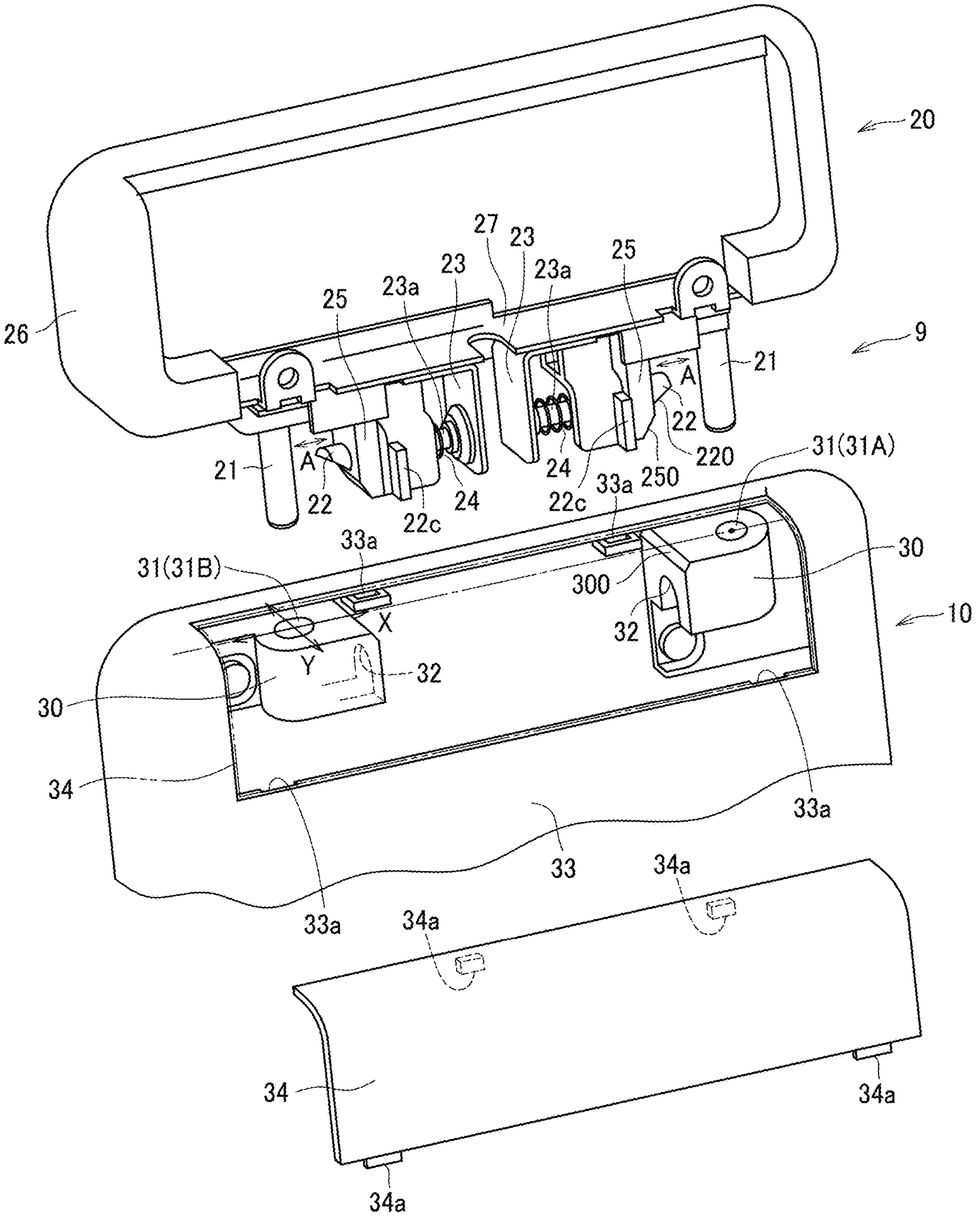
FIG. 3 is a perspective view of a functional expansion unit and an operation panel, illustrating an attachment structure according to the embodiment of the present disclosure.

FIG. 3 is a perspective view of the functional expansion unit 20 and the operation panel 10, illustrating an attachment structure 9 according to the embodiment of the present disclosure.

As illustrated in FIG. 3, the functional expansion unit 20 and the operation panel 10 are provided with the attachment structure 9 allowing the functional expansion unit 20 to be attached to the operation panel 10. Specifically, the attachment structure 9 includes a pair of positioning shafts 21, a pair of lock members 22, a pair of holders 23 that hold one-to-one the pair of lock members 22, a pair of springs 24 that press one-to-one the pair of lock members 22, a pair of stoppers 25 that regulate one-to-one movements of the pair of lock members 22, and a pair of positioning lock members 30. The pair of positioning shafts 21, the pair of lock members 22, the pair of holders 23, the pair of springs 24, and the pair of stoppers 25 are provided to the functional expansion unit 20. The pair of positioning lock members 30 are provided to the operation panel 10.

The positioning shafts 21 each serve as a straight rod having a circular cross section and protrude from a unit body 26 of the functional expansion unit 20. In order to have rigidity, preferably, the positioning shafts 21 are each formed of a metallic material, for example. In the embodiment of the present disclosure, the pair of positioning shafts 21 are integrated through a support plate 27 secured to the unit body 26. Note that the positioning shafts 21 are not limited to being integrated and thus may be separated from each other.

The lock members 22 are each held movably in the direction of a double-headed arrow A in FIG. 3 by the corresponding holder 23. In this case, the holders 23 each include a guide shaft 23*a* extending in a direction that is orthogonal to or crosses the axial direction of the corresponding positioning shaft 21. The lock members 22 are each held slidably, in a direction that is orthogonal to or crosses the axial direction of the corresponding positioning shaft 21 (in the direction of the double-headed arrow A), along the corresponding guide shaft 23*a*. Preferably, the holders 23 including the respective guide shafts 23*a* are each formed of a metallic material in order to have rigidity. Meanwhile, preferably, the lock members 22 are each formed of a resin material having a low coefficient of friction in order to have slidability to the corresponding guide shaft 23*a*.

The guide shafts 23*a* each hold the corresponding spring 24. The springs 24 are each a coil spring through which the corresponding guide shaft 23*a* is inserted on the center line of the coil spring. Thus, the springs 24 are each held so as to lengthen or shorten in the axial direction of the corresponding guide shaft 23*a*.

The stoppers 25 each serve as a member that regulates movement of the corresponding lock member 22 against the pressing force of the corresponding spring 24 to prevent the corresponding lock member 22 from falling off the corresponding guide shaft 23*a*. That is, the lock members 22 each butt against the corresponding stopper 25 due to pressing of the corresponding spring 24 such that movements of the lock members 22 are regulated, so that the lock members 22 are each held at a predetermined position.

The positioning lock members 30 serve as members that are provided to the operation panel 10 and position and lock the functional expansion unit 20 in cooperation with the positioning shafts 21 and the lock members 22. Specifically, the positioning lock members 30 each include a positioning hole 31 in which the corresponding positioning shaft 21 can be inserted and a lock-engageable part 32 engageable with the corresponding lock member 22.

The operation panel 10 includes a rear cover 34 detachably attachable to a housing 33 of the operation panel 10. With the rear cover 34 attached to the housing 33, the housing 33 has its opening occluded, that is, each positioning lock member 30 is covered without being viewed from outside. The housing 33 is provided with a plurality of engageable recesses 33*a* in order to secure the rear cover 34. One-to-one correspondence engagement between a plurality of engageable protrusions 34*a* provided to the rear cover 34 and the plurality of engageable recesses 33*a* of the housing 33 causes the rear cover 34 to be secured to the housing 33.

Figure 4:
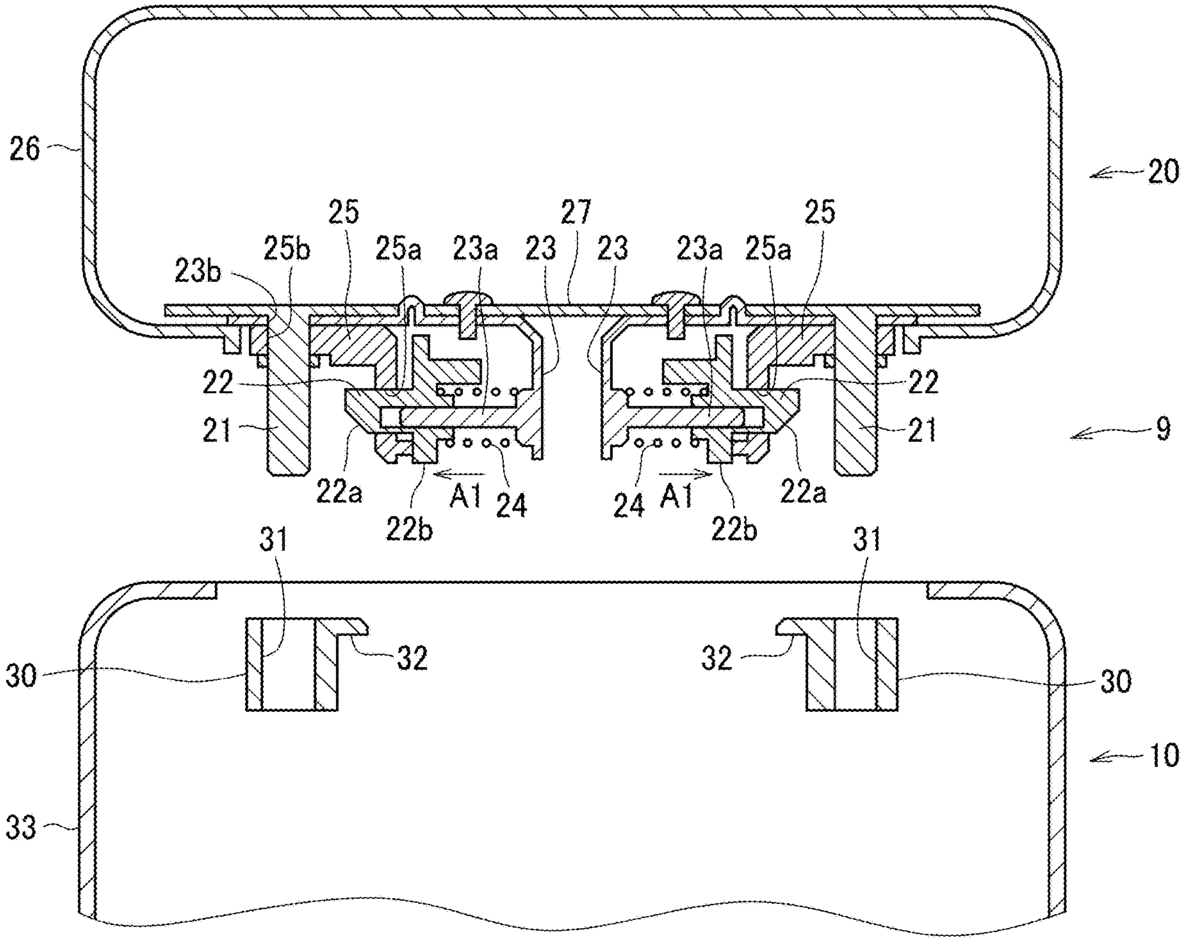
FIG. 4 is a cross-sectional view of the functional expansion unit and the operation panel, illustrating the attachment structure according to the embodiment of the present disclosure.

FIG. 4 is a cross-sectional view of the functional expansion unit 20 and the operation panel 10, illustrating the attachment structure 9 according to the embodiment of the present disclosure.

As illustrated in FIG. 4, the springs 24 are each held in compression in the axial direction of the corresponding guide shaft 23*a* between the base end of the corresponding guide shaft 23*a* and the corresponding lock member 22. Thus, the lock members 22 are each pressed, due to the elastic force of the corresponding spring 24, in a locking direction that is the direction of an arrow A1 in FIG. 4. Meanwhile, the stoppers 25 each regulate movement in the locking direction A1 of the corresponding lock member 22 against the pressing force of the corresponding spring 24. In this case, the stoppers 25 each have a hole 25*a* allowing a leading end 22*a* of the corresponding lock member 22 to pass through. Therefore, in response to pressing in the locking direction A1 of each lock member 22, the leading end 22*a* of each lock member 22 passes through the hole 25*a* of the corresponding stopper 25 but a remainder 22*b* of each lock member 22 butts against the corresponding stopper 25, leading to regulation of the movement in the locking direction A1 of each lock member 22.

Procedure for Attachment of Functional Expansion Unit

Next, a procedure for attachment of the functional expansion unit 20 according to the embodiment of the present disclosure will be described with FIGS. 3 to 7.

First, in order to attach the functional expansion unit 20 to the operation panel 10, as illustrated in FIG. 3, the rear cover 34 is detached from the operation panel 10 to expose the pair of positioning lock members 30.

Next, as illustrated in FIG. 4, the leading ends of the pair of positioning shafts 21 of the functional expansion unit 20 are oriented one-to-one to the positioning holes 31 of the positioning lock members 30.

Figure 5:
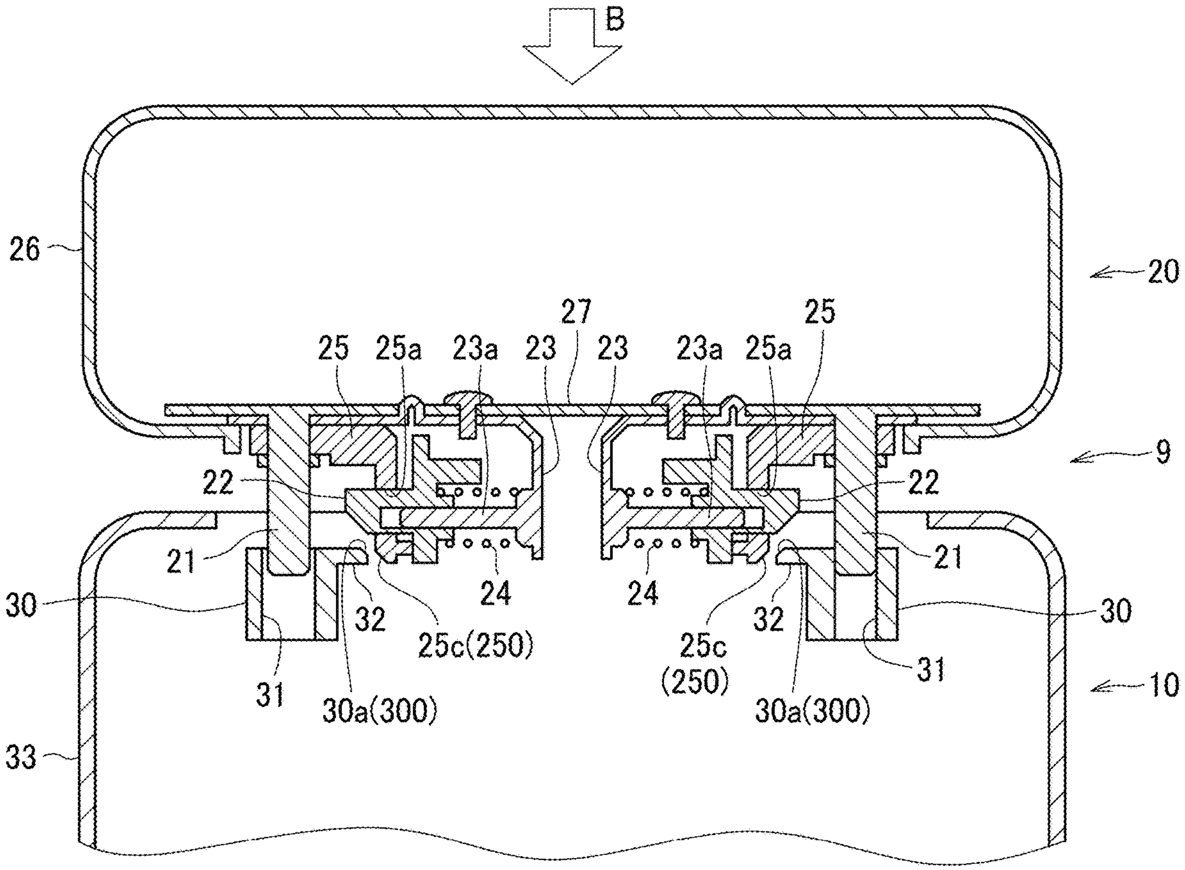
FIG. 5 is a cross-sectional view for describing a procedure for attachment of the functional expansion unit according to the embodiment of the present disclosure.

Then, as illustrated in FIG. 5, the functional expansion unit 20 is brought closer to the operation panel 10 in the direction of an arrow B in FIG. 5 as an attachment direction and then each positioning shaft 21 is inserted into the corresponding positioning hole 31. In this case, the stoppers 25 each have a corner 25*c* provided with a slope 250 inclined with respect to the attachment direction B of the functional expansion unit 20, and the positioning lock members 30 each have a corner 30*a* provided with a slope 300 inclined with respect to the attachment direction B of the functional expansion unit 20, in which each corner 25*c* comes close to the corresponding corner 30*a*. Thus, during attachment of the functional expansion unit 20, even when the corner 25*c* of each stopper 25 and the corner 30*a* of the corresponding positioning lock member 30 come in contact with each other, because the slope 250 and the slope 300 come in contact with each other, the functional expansion unit 20 is smoothly guided. The locking direction is opposite to the unlocking direction and intersects the attachment direction.

Figure 6:
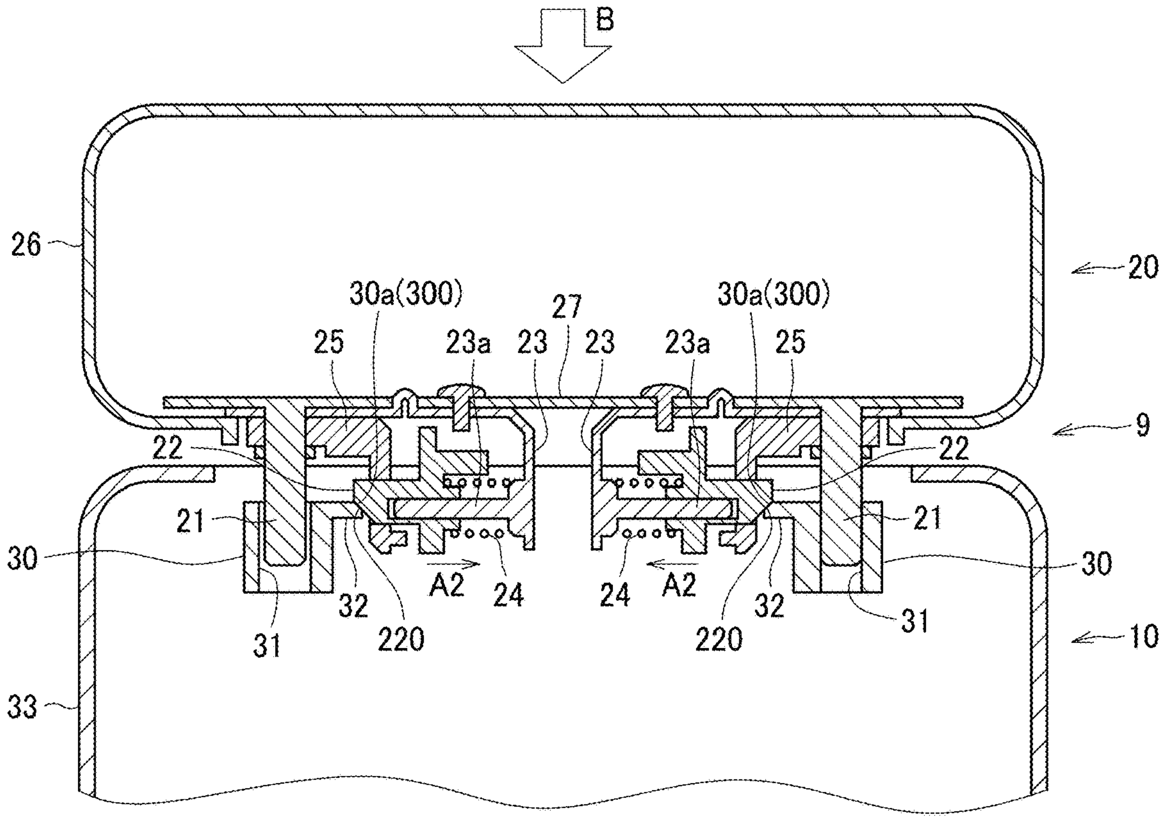
FIG. 6 is a cross-sectional view for describing the procedure for attachment of the functional expansion unit according to the embodiment of the present disclosure.

After that, as illustrated in FIG. 6, in response to further insertion of the pair of positioning shafts 21 into the positioning holes 31, the leading end 22*a* of each lock member 22 comes in contact with the corner 30*a* of the corresponding positioning lock member 30, so that each lock member 22 is thrust in an unlocking direction A2 opposite to the locking direction A1. In this case, for smooth movement in the unlocking direction A2 of each lock member 22, the leading end 22*a* of each lock member 22 is provided with a slope 220 inclined with respect to the attachment direction B of the functional expansion unit 20. That is, in response to contact of the leading end 22*a* of each lock member 22 with the corner 30*a* of the corresponding positioning lock member 30, the slope 220 and the slope 300 come in contact with each other, so that each lock member 22 is smoothly thrust in the unlocking direction A2 opposite to the locking direction A1.

Figure 7:
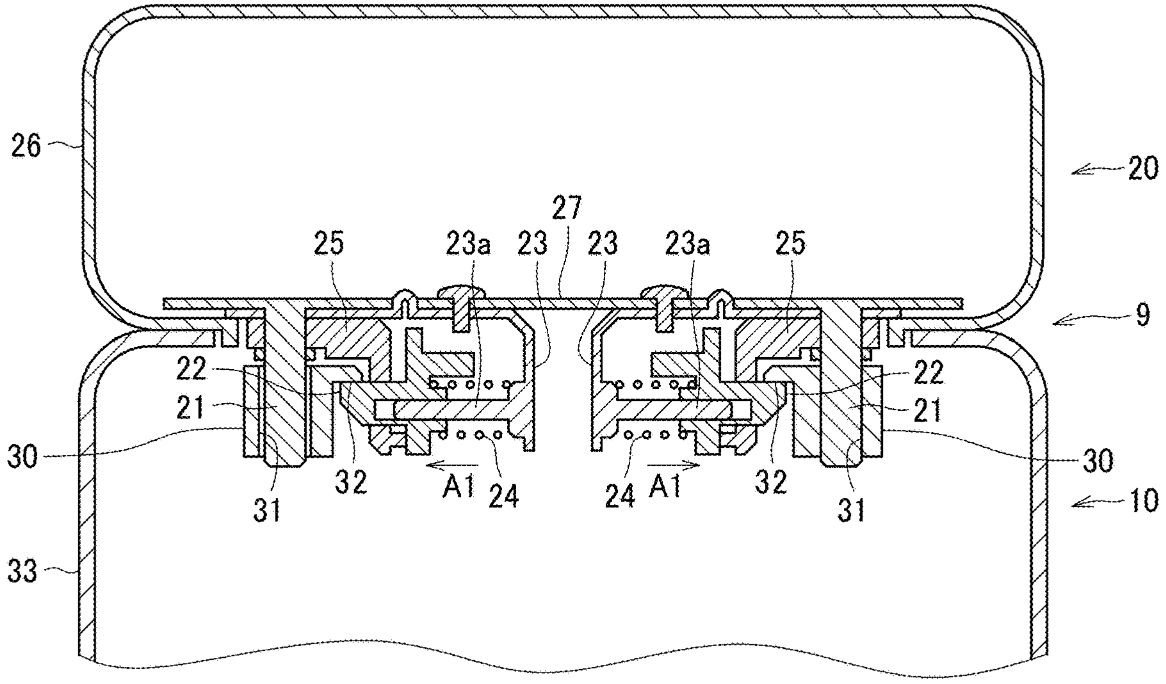
FIG. 7 is a cross-sectional view for describing the procedure for attachment of the functional expansion unit according to the embodiment of the present disclosure.

Then, as illustrated in FIG. 7, with the pair of positioning shafts 21 completely inserted in the positioning holes 31, the leading end 22*a* of each lock member 22, which has gotten over the corner 30*a* of the corresponding positioning lock member 30, engages with the corresponding lock-engageable part 32, that is, a locked state is obtained. That is, when the leading end 22*a* of each lock member 22 gets over the corner 30*a* of the corresponding positioning lock member 30, each lock member 22 is thrust in the locking direction A1 due to pressing of the corresponding spring 24, resulting in a state where the leading end 22*a* of each lock member 22 engages with the corresponding lock-engageable part 32. With the state, since each positioning shaft 21 is inserted in the corresponding positioning hole 31, the functional expansion unit 20 is positioned.

Figure 8:
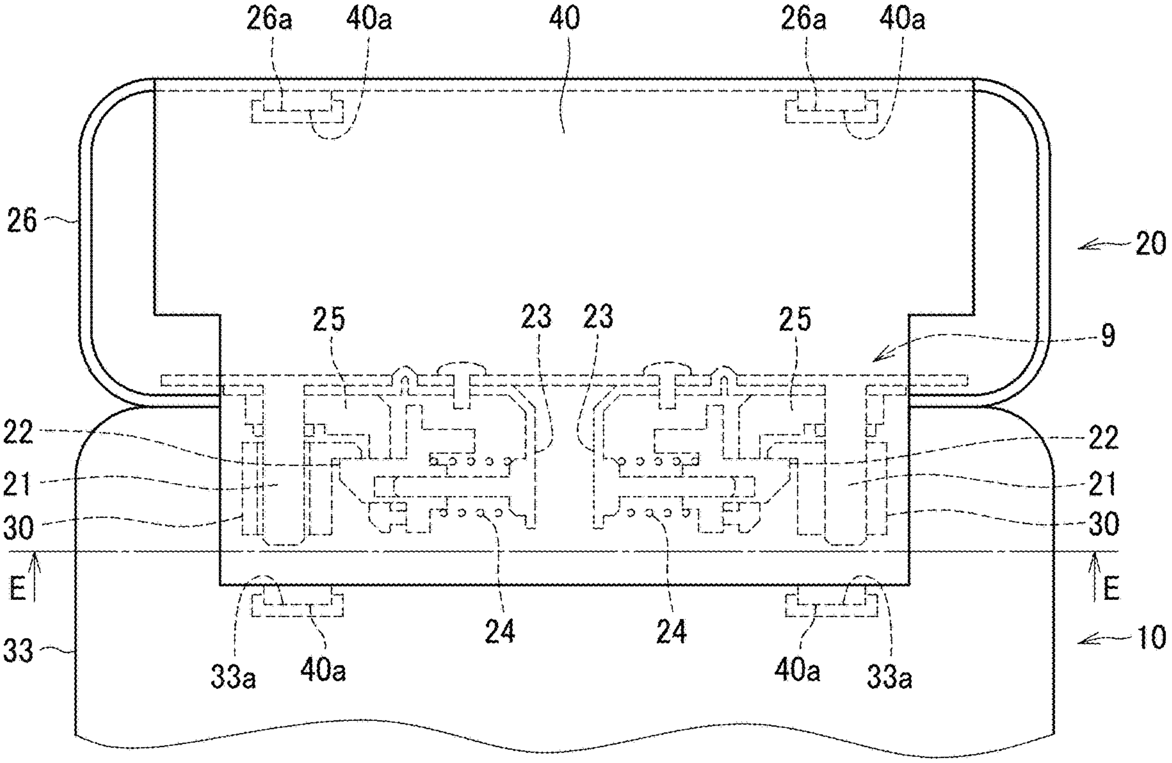
FIG. 8 is an external view illustrating a state where a cover in common is attached to the rears of the functional expansion unit and the operation panel according to the embodiment of the present disclosure.

Finally, as illustrated in FIG. 8, a cover 40 in common is attached to the rears of the functional expansion unit 20 and the operation panel 10. Thus, the entirety of the attachment structure 9 including the positioning shafts 21, the lock members 22, and the positioning lock members 30 is covered with the cover 40, that is, the attachment structure 9 is kept from being viewed from outside. The cover 40 includes a plurality of engageable protrusions 40*a* that is engageable with engageable recesses 26*a* provided to the unit body 26 of the functional expansion unit 20 and the engageable recesses 33*a* of the operation panel 10. Thus, due to engagement of the engageable protrusions 40*a* of the cover 40 with the engageable recesses 26*a* of the functional expansion unit 20 and the engageable recesses 33*a* of the operation panel 10, the cover 40 is secured to the functional expansion unit 20 and the operation panel 10. Thus, the attachment of the functional expansion unit 20 to the operation panel 10 is completed.

Procedure for Detachment of Functional Expansion Unit

In order to detach the functional expansion unit 20 from the operation panel 10, basically, detachment is performed in a procedure reverse to the procedure for attachment.

First, the cover 40 in common is detached to expose the attachment structure 9. Next, each lock member 22 is moved in the unlocking direction A2 opposite to the locking direction A1 to unlock the engagement of each lock member 22 with the corresponding lock-engageable part 32. Thus, the locked state is unlocked. In the embodiment of the present disclosure, for easy unlocking of the locked state, as illustrated in FIG. 3, each lock member 22 is provided with a protruding knob 22*c*. For example, while pinching each knob 22*c*, a user or an operator moves each knob 22*c* in a direction in which the lock members 22 come close to each other (in the unlocking direction A2), so that the locked state can be easily unlocked.

Then, with the locked state unlocked, the functional expansion unit 20 is moved in the direction opposite to the attachment direction B (in a detachment direction C in FIG. 9 described later) to pull out the positioning shafts 21 from the positioning holes 31. Thus, the functional expansion unit 20 is detached from the operation panel 10. After detachment of the functional expansion unit 20, the rear cover 34 is attached to the operation panel 10 to keep the positioning lock members 30 from being viewed from outside.

Issues regarding Lock Mechanism

An attachment structure allowing a functional expansion unit to be attached to an electronic device, such as an operation panel, may need a preventive measure against careless detachment of the functional expansion unit. For example, if an image forming apparatus installed in a commercial facility, such as a convenience store, enables a functional expansion unit to be easily detached, a customer is likely to detach the functional expansion unit, accidentally, or the functional expansion unit is likely to be detached improperly for theft or malicious mischief.

On the other hand, use of screws for firmly attachment of the functional expansion unit causes, as a disadvantage, a troublesome operation for attachment or detachment of the functional expansion unit. Therefore, preferably, an attachment structure for a functional expansion unit enables prevention of improper or unintended detachment and easy attachment and detachment.

On this point, since the attachment structure 9 according to the embodiment of the present disclosure includes the lock members 22 each movable in the locking and unlocking directions, the attachment structure 9 enables easy attachment of the functional expansion unit 20 for securing and easy detachment of the functional expansion unit 20, without any fasteners, such as screws. In addition, after attachment, the attachment structure 9 is kept from being viewed from outside because of being covered with the cover 40. Thus, careless detachment of the functional expansion unit 20 due to an accidental operation on the lock members 22 by a customer can be prevented or improper access to the attachment structure 9 can be inhibited, leading to a reduction in the frequency of occurrence of damage due to theft or malicious mischief.

However, in a case where a force is applied to detach the functional expansion unit 20 forcedly for theft or malicious mischief, the attachment of the cover 40 may be insufficient to keep the state where the functional expansion unit 20 is attached. For example, in response to displacement or deformation of a member included in a lock mechanism due to a force acting to detach the functional expansion unit 20 forcedly, the locked state is likely to be unlocked, leading to improper detachment of the functional expansion unit 20.

Thus, in the embodiment of the present disclosure, for achievement of easy attachment and detachment of the functional expansion unit and for prevention of improper or unintended detachment, such an unlocking prevention structure as below is adopted. An unlocking prevention structure according to the embodiment of the present disclosure will be described below.

Mechanism to Unlock Locked State

First, a mechanism to unlock the locked state will be described with reference to FIG. 9.

Figure 9:
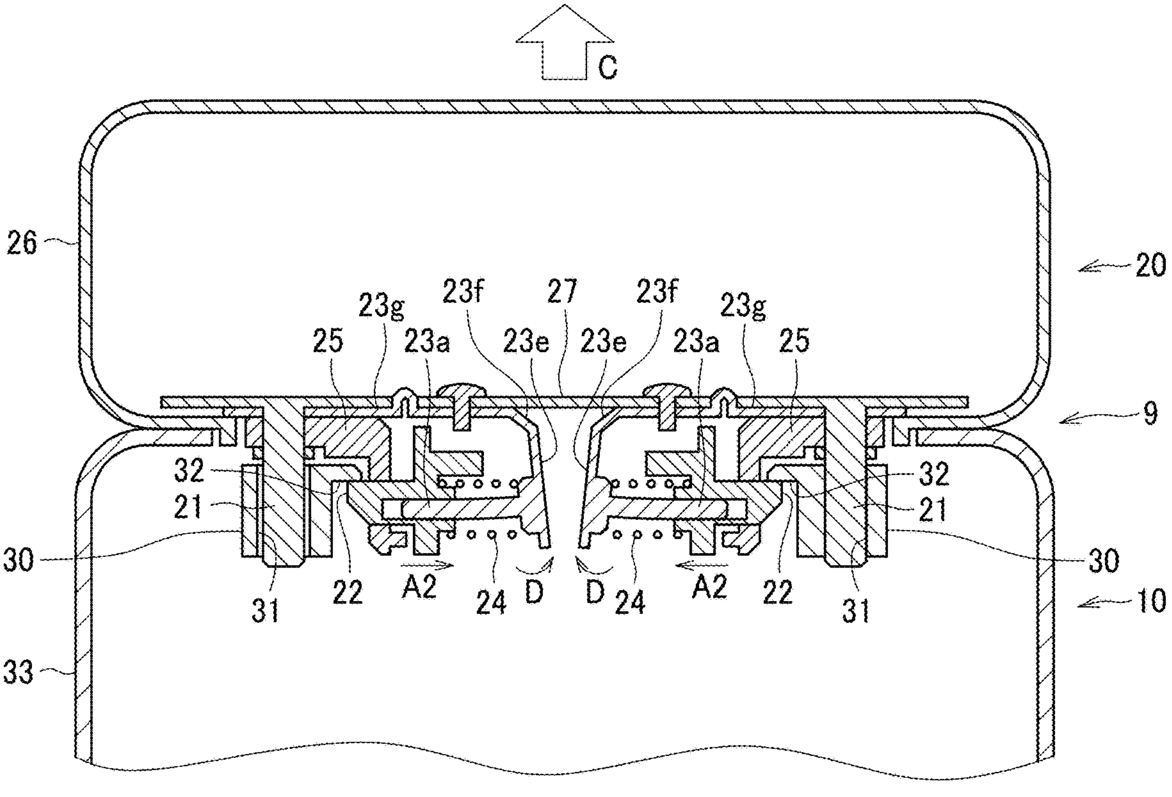
FIG. 9 is a reference view for describing a mechanism to unlock a locked state.

As illustrated in FIG. 9, in a case where a force acts to pull out, in the detachment direction C, the functional expansion unit 20 having been locked, in response to pulling in the detachment direction C of the unit body 26, the pair of holders 23 are pulled in the detachment direction C. In this case, although the force in the detachment direction C acts also on the pair of lock members 22, because each lock member 22 engages with the corresponding lock-engageable part 32, movement of in the detachment direction C of each lock member 22 is regulated. As a result, the holders 23 warp and deform to come close to each other as indicated with arrows D in FIG. 9. In particular, in the embodiment of the present disclosure, each holder 23 is formed as an L shape including two extended parts 23*e* and 23*g* that extend from a bent part 23*f*, respectively, in two directions orthogonal to each other or crossing each other. Thus, in response to pulling in the detachment direction C of the extended parts 23*g* secured to the support plate 27, warps are generated with the bent parts 23*f* each as a base, so that the extended parts 23*e* holding the corresponding lock members 22 deform to come close to each other in the directions of the arrows D. Along with deformation of the extended parts 23*e*, the lock members 22 are displaced to come close to each other. Thus, each lock member 22 moves in the unlocking direction A2 to unlock the engagement with the corresponding lock-engageable part 32.

As a result, the engagement of each lock member 22 with the corresponding lock-engageable part 32 is unlocked, leading to detachment of the functional expansion unit 20 from the operation panel 10.

For prevention of such detachment of the functional expansion unit 20 as above, each lock member 22 requires regulating in movement (displacement) in the unlocking direction A2. Thus, the attachment structure 9 according to the embodiment of the present disclosure includes such an unlocking prevention structure as below.

Unlocking Prevention Structure According to Present Embodiment

Figure 10:
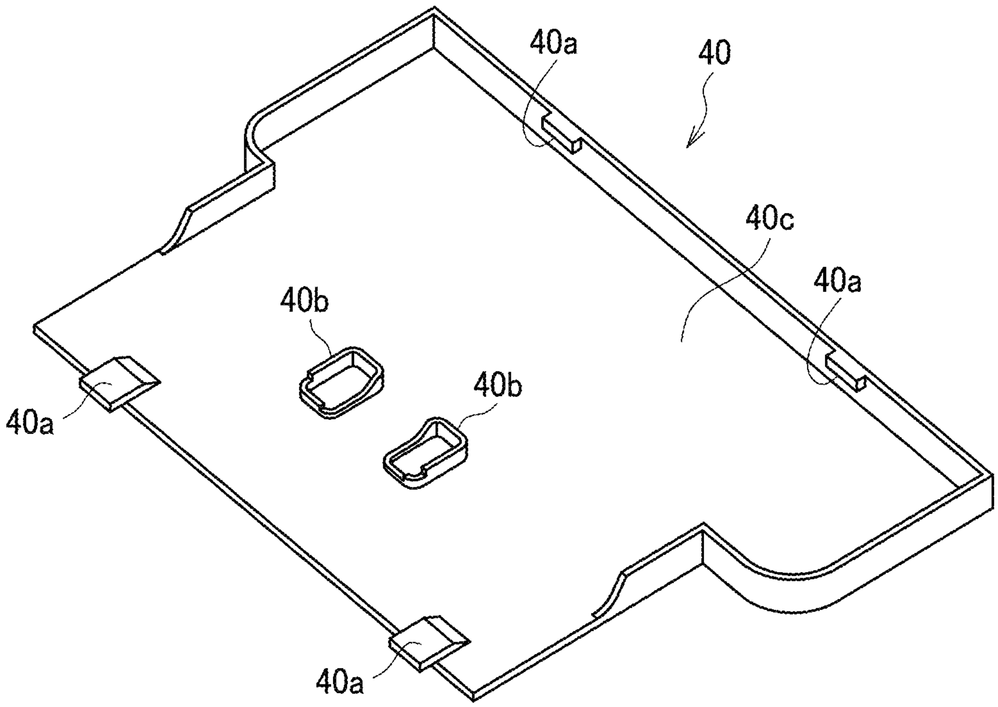
FIG. 10 is a perspective view of the cover, viewed from inside, according to the embodiment of the present disclosure.

FIG. 10 is a perspective view of the cover 40, viewed from inside, according to the embodiment of the present disclosure.

As illustrated in FIG. 10, the cover 40 has an inner face 40*c* provided with a pair of unlock restricting parts 40*b* as an unlocking prevention structure. Each unlock restricting part 40*b* includes an annular projection protruding from the inner face 40*c* of the cover 40.

Figure 11:
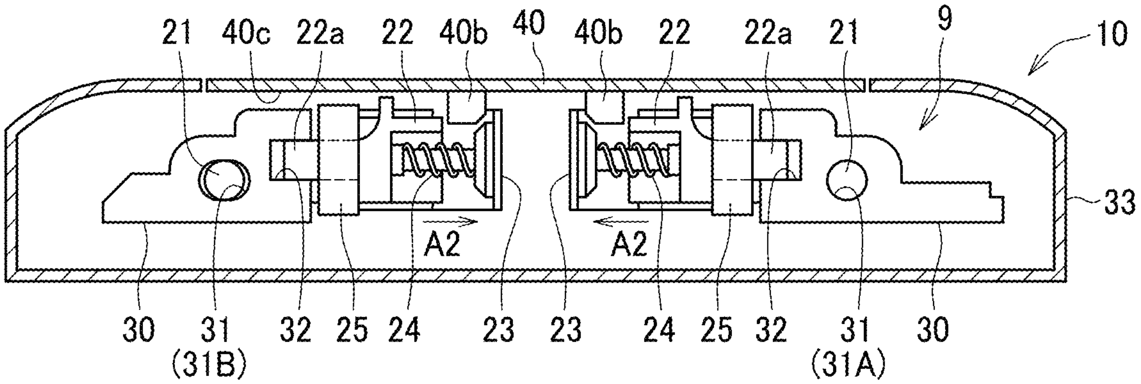
FIG. 11 is a cross-sectional view taken along line E-E of FIG. 8, illustrating a state where the cover is attached to the operation panel, according to the embodiment of the present disclosure.

FIG. 11 is a cross-sectional view taken along line E-E of FIG. 8, illustrating a state where the cover 40 is attached to the operation panel 10, according to the embodiment of the present disclosure.

As illustrated in FIG. 11, with the cover 40 attached, each unlock restricting part 40*b* is disposed between the pair of lock members 22. That is, each unlock restricting part 40*b* is located on the downstream side in the unlocking direction A2 of the pair of lock members 22 and is disposed close to or in contact with the corresponding lock member 22.

As above, since each unlock restricting part 40*b* is located on the downstream side in the unlocking direction A2 of the pair of lock members 22 and is disposed close to or in contact with the corresponding lock member 22, the engagement of each lock member 22 with the corresponding lock-engageable part 32 can be prevented from being unlocked. That is, even when each lock member 22 tries to move in the unlocking direction A2, each lock member 22 comes in contact with the corresponding unlock restricting part 40*b*, so that movement in the unlocking direction A2 of each lock member 22 is regulated. Thus, the engagement of each lock member 22 is prevented from being unlocked. In particular, in the embodiment of the present disclosure, each unlock restricting part 40*b* includes the annular projection. Thus, each unlock restricting part 40*b* is less likely to deform or break at the time of contact with the corresponding lock member 22 than an unlock restricting part 40*b* including a tabular projection.

Thus, movement in the unlocking direction A2 of each lock member 22 can be regulated reliably. Therefore, the attachment structure 9 according to the embodiment of the present disclosure enables the engagement of each lock member 22 with the corresponding lock-engageable part 32 to be kept from being unlocked even when a force is applied to detach the functional expansion unit 20 forcedly for theft or malicious mischief. Thus, the functional expansion unit 20 can be prevented from being detached improperly or unintendedly.

In the embodiment of the present disclosure, since the unlock restricting parts 40*b* are provided on the inner face 40*c* of the cover 40, the presence of the unlock restricting parts 40*b* is kept from getting known from outside.

Thus, it is difficult for anyone, except particular users or operators, to speculate a method of unlocking the locked state at a glance. Therefore, the attachment structure 9 according to the embodiment of the present disclosure enables a reduction in the risk of improper detachment for malicious mischief or theft, leading to an improvement in reliability. With the cover 40 attached, the unlock restricting parts 40*b* are not exposed outward. Thus, a favorable design can be kept without spoiling the beauty of external appearance.

With the cover 40 attached, the unlock restricting parts 40*b* may be each disposed in contact with the corresponding lock member 22 or in noncontact with the corresponding lock member 22. Note that, in a case where the unlock restricting parts 40*b* are each disposed in noncontact with the corresponding lock member 22, the unlock restricting parts 40*b* each require disposing so as to have contact with the corresponding lock member 22 such that movement in the unlocking direction A2 of each lock member 22 can be regulated.

Figure 12:
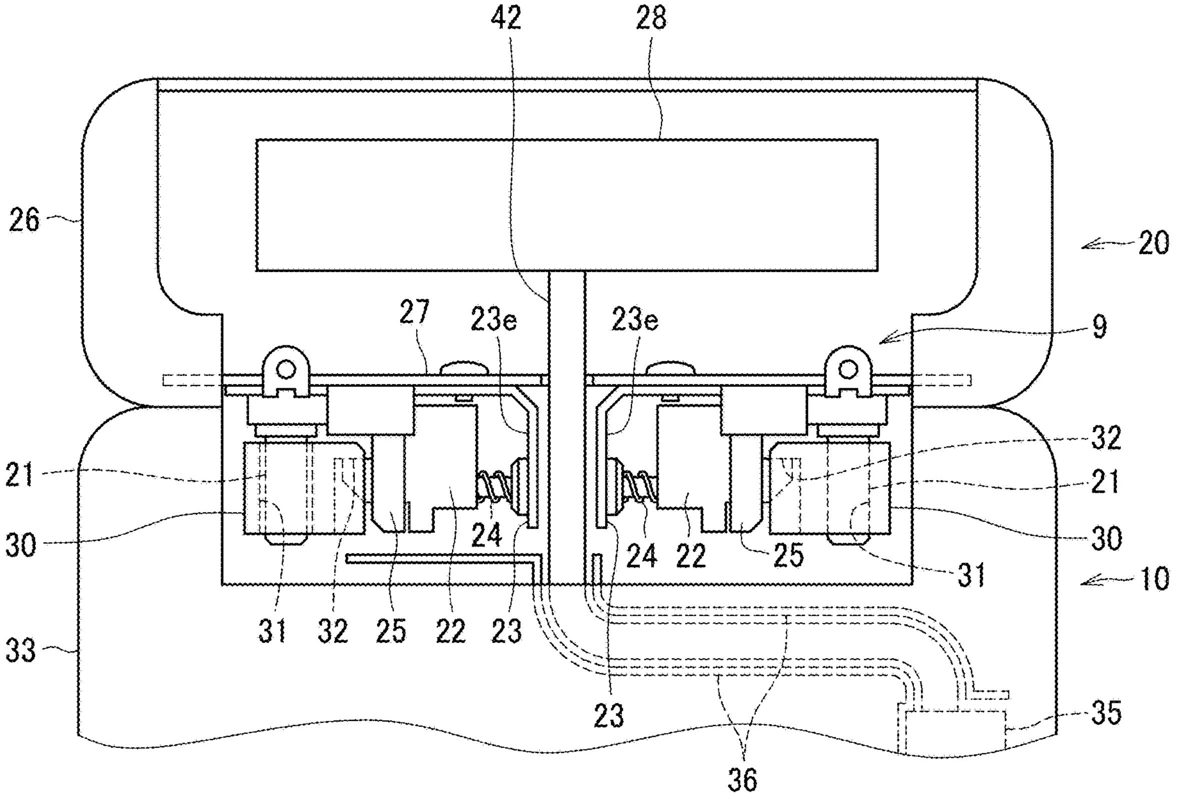
FIG. 12 is a schematic view illustrating a state where the functional expansion unit and the operation panel are coupled through a wiring member.

As illustrated in FIG. 12, in a case where the attachment structure 9 includes a wiring member 42 that electrically connects the functional expansion unit 20 and the operation panel 10, unlocking can be prevented with the wiring member 42. An unlocking prevention structure with the wiring member 42 will be described below.

The wiring member 42 illustrated in FIG. 12 is, for example, a universal serial bus (USB) cable that electrically connects a printed circuit board 28 mounted on the functional expansion unit 20 and a connector 35 provided to the operation panel 10. Information read by the functional expansion unit 20 serving as a card reader is sent to the controller 7 of the image forming apparatus 100 through the wiring member 42.

In the embodiment of the present disclosure, for prevention of unlocking, the wiring member 42 is disposed across the space between the pair of holders 23. That is, the wiring member 42 is disposed between the mutually facing extended parts 23*e* of the holders 23. Thus, the extended parts 23*e* can be inhibited from deforming to come close to each other. Thus, the lock members 22 can be each inhibited from being displaced in the unlocking direction A2 along with deformation of the corresponding extended part 23*e*, so that the locked state can be reliably prevented from being unlocked.

Even if either unlock restricting part 40*b* is broken by a load due to a pulling force, since the wiring member 42 is located between the holders 23, the wiring member 42 can function as a buffer that inhibits the holders 23 from abruptly deforming. Thus, a situation where the functional expansion unit 20 is roughly pulled out can be avoided, leading to an improvement in safety.

As illustrated in FIG. 12, in a case where the wiring member 42 is disposed in a bent manner, an increase can be made in the resistance against pulling out of the functional expansion unit 20, so that the functional expansion unit 20 can be reliably inhibited from being roughly pulled out. That is, even when the wiring member 42 is pulled along with detachment of the functional expansion unit 20, the wiring member 42 comes in contact with a wiring path member 36 at its bent portions, causing resistance. Thus, the pulling of the wiring member 42 is suppressed. Thus, the functional expansion unit 20 can be inhibited from being roughly pulled out. Note that, in the example illustrated in FIG. 12, the wiring path member 36 is provided to the housing 33 of the operation panel 10. However, the wiring path member 36 may be provided to the functional expansion unit 20, instead of the operation panel 10.

As above, the attachment structure 9 according to the embodiment of the present disclosure enables prevention of the locked state from being unlocked, leading to an improvement in reliability. Without any fasteners, such as screws, the functional expansion unit 20 can be prevented from being detached improperly or unintendedly. In addition, the functional expansion unit 20 can be attached or detached easily. That is, the attachment structure 9 according to the embodiment of the present disclosure enables, with the detachably attachable cover 40, implementation of easy attachment and detachment of the functional expansion unit 20 and prevention of improper or unintended detachment.

Attachability of Functional Expansion Unit

The attachment structure 9 according to the embodiment of the present disclosure has such features as below in order to improve the attachability of the functional expansion unit 20. Attachability in the embodiment of the present disclosure will be described below.

For accurate attachment of the functional expansion unit 20, as illustrated in FIG. 3, the attachment structure 9 according to the embodiment of the present disclosure includes the pair of positioning shafts 21 each achieved with a rod having a circular cross section. Then, one of the pair of positioning holes 31, in which the positioning shafts 21 are inserted, is a circular hole 31A for a main criterion and the other hole is an elongated hole 31B for a secondary criterion.

As the positioning hole 31 for the main criterion, formed is the circular hole 31A substantially identical in diameter to the corresponding positioning shaft 21. Meanwhile, as the positioning hole 31 for the secondary criterion, formed is the elongated hole 31B having a width larger than the diameter of the corresponding positioning shaft 21 in an X direction in FIG. 3 extending radially from the center of the other positioning hole 31 (circular hole 31A). The elongated hole 31B has a width, in a Y direction orthogonal to the X direction, substantially identical in size to the diameter of the corresponding positioning shaft 21. Thus, in response to insertion of the pair of positioning shafts 21 in the positioning holes 31, the functional expansion unit 20 has a main criterial position determined by the positioning hole 31 (circular hole 31A) for the main criterion. In addition, the functional expansion unit 20 has a position in the direction of rotation around the main criterial position and a position in the Y direction determined by the positioning hole 31 (elongated hole 31B) for the secondary criterion.

As above, the attachment structure 9 according to the embodiment of the present disclosure includes the pair of positioning shafts 21 each having a circular cross section, the circular hole 31A for the main criterion as one of the pair of positioning holes 31, and the elongated hole 31B for the secondary criterion as the other, leading to an improvement in the accuracy of attachment of the functional expansion unit 20. For example, in a case where the positioning shafts 21 each have a quadrangular cross section and the positioning holes 31 each have a quadrangular cross section for an attachment structure, positioning reference planes are difficult to specify, leading to a low accuracy of positioning. In contrast to this, in the embodiment of the present disclosure, due to positioning with one of the positioning shafts 21 having a circular cross section and the corresponding positioning hole 31 (circular hole 31A) having a circular cross section, a single position can be determined as the criterial (main criterial) position of the functional expansion unit 20 to the operation panel 10. Then, due to insertion of the other positioning shaft 21 in the corresponding positioning hole 31 as the elongated hole 31B, rotation of the functional expansion unit 20 around the main criterial position is regulated, so that the position of the functional expansion unit 20 can be accurately determined. Thus, an improvement can be made in the accuracy of position of the functional expansion unit 20 to the operation panel 10, so that the functional expansion unit 20 can be accurately attached. In addition, an improvement is made in the accuracy of relative position between each lock member 22 and the corresponding lock-engageable part 32. Thus, poor engagement of each lock member 22 can be reduced, leading to improvements in attachability and reliability.

For an improvement in the accuracy of positioning, preferably, the positioning shafts 21 are disposed as far away from each other as possible. Thus, in the attachment structure 9 according to the embodiment of the present disclosure, the lock members 22, the holders 23, the springs 24, and the stoppers 25 included in the lock mechanism are disposed between the pair of positioning shafts 21 that are disposed one-to-one close to both ends in the longitudinal direction of the unit body 26. Thus, an improvement can be made in the accuracy of positioning, in comparison to a case where the positioning shafts 21 are disposed close to each other. Note that the arrangement of the positioning shafts 21 is not limited to the configuration according to the embodiment of the present disclosure and thus may be changed as appropriate depending on the layout of other components.

In the attachment structure 9 according to the embodiment of the present disclosure, for an improvement in attachability, each holder 23 that holds the corresponding lock member 22 and the corresponding stopper 25 that regulates movement of the corresponding lock member 22 are positioned as follows. A positioning structure for a holder 23 and a stopper 25 will be described below with reference to FIG. 13.

Figure 13:
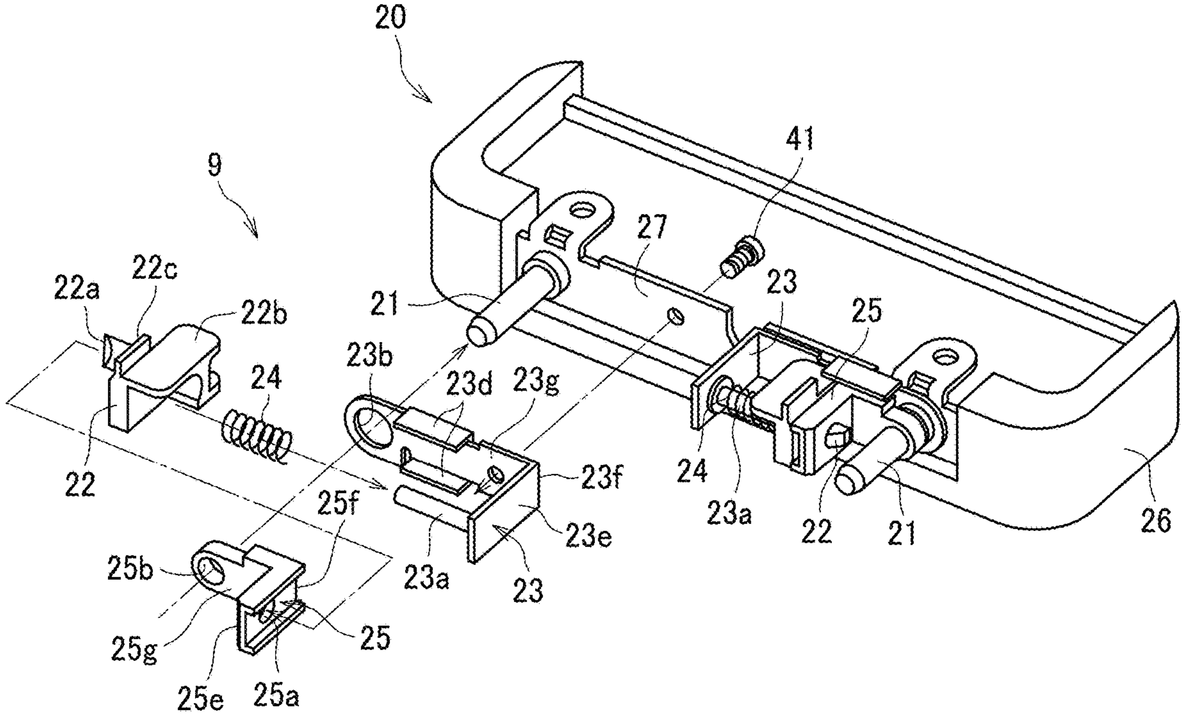
FIG. 13 is an exploded perspective view of the functional expansion unit according to the present disclosure.

FIG. 13 is an exploded perspective view of the functional expansion unit 20 according to the embodiment of the present disclosure.

As illustrated in FIG. 13, a holder 23 and a stopper 25 are each attachable to a positioning shaft 21. Specifically, referring to FIG. 13, the holder 23 includes an extended part 23*g* that extends in a direction orthogonal to or crossing the axial direction of the positioning shaft 21 and has a shaft insertion hole 23*b* for insertion of the positioning shaft 21. The holder 23 further includes an extended part 23*e* that extends in the axial direction of the positioning shaft 21 and is provided with a guide shaft 23*a* that holds a lock member 22 and a spring 24. The stopper 25 is L-shaped like the holder 23 and includes two extended parts 25*e* and 25*g* extending from a bent part 25*f*, respectively, in two directions that are orthogonal to or cross each other. Referring to FIG. 13, the extended part 25*g* of the stopper 25, extending in a direction orthogonal to or crossing the axial direction of the positioning shaft 21, has a shaft insertion hole 25*b* for insertion of the positioning shaft 21. The extended part 25*e* of the stopper 25, extending in the axial direction of the positioning shaft 21, has a hole 25*a* for insertion of a leading end 22*a* of the lock member 22.

In response to insertion of the positioning shaft 21 through the respective shaft insertion holes 23*b* and 25*b* of the holder 23 and the stopper 25, the holder 23 and the stopper 25 are positioned with respect to the positioning shaft 21. That is, in response to contact of the respective circular inner circumferential faces of the shaft insertion holes 23*b* and 25*b* of the holder 23 and the stopper 25 with the circular outer circumferential face of the positioning shaft 21, the holder 23 and the stopper 25 are positioned with respect to the positioning shaft 21.

After the positioning shaft 21 is inserted through the shaft insertion hole 23*b*, the holder 23 is fastened to the support plate 27 through a screw 41, so that rotation of the holder 23 around the positioning shaft 21 is regulated. Meanwhile, after the holder 23 is attached to the positioning shaft 21, the positioning shaft 21 is inserted through the shaft insertion hole 25*b* of the stopper 25, so that the stopper 25 is attached. In this case, the stopper 25 is inserted between a pair of support pieces 23*d* of the holder 23, so that rotation of the stopper 25 around the positioning shaft 21 is regulated.

As above, in the embodiment of the present disclosure, since the holder 23 and the stopper 25 are positioned with respect to the same positioning shaft 21, an improvement is made in the accuracy of relative position between the holder 23 and the stopper 25. The improvement in the accuracy of relative position between the holder 23 and the stopper 25 causes an improvement in the accuracy of position of the lock member 22. Thus, the lock member 22 can operate favorably and have a favorable locked state, leading to an improvement in attachability.

Furthermore, in the embodiment of the present disclosure, for an improvement in attachability, the positioning lock member 30 to which each positioning hole 31 is provided and the positioning lock member 30 to which the corresponding lock-engageable part 32 is provided in the operation panel 10 are the same, instead of being different from each other. Thus, an assembly error between members can be eliminated in comparison to a case where each positioning hole 31 and the corresponding lock-engageable part 32 are achieved with different members. Thus, each positioning hole 31 and the corresponding lock-engageable part 32 can be protected against relative positional misalignment due to an assembly error between members. As above, according to the embodiment of the present disclosure, an improvement is made in the accuracy of relative position between each positioning hole 31 and the corresponding lock-engageable part 32. Thus, each positioning shaft 21 can be smoothly inserted in the corresponding positioning hole 31 and additionally each lock member 22 can be reliably engaged with the corresponding lock-engageable part 32, leading to an improvement in attachability.

Furthermore, in the embodiment of the present disclosure, the lock-engageable parts 32 are each formed as a groove U-shaped in cross section (refer to FIG. 3) such that the lock-engageable parts 32 are each high in the accuracy of dimensions. That is, the lock-engageable parts 32 may each have any shape that is not U-shaped, like a circular hole. However, in general, a circular hole is more difficult to process than a U-shaped groove and is low in the accuracy of dimensions. Thus, in the embodiment of the present disclosure, since the lock-engageable parts 32 are each formed of a groove U-shaped in cross section, the lock-engageable parts 32 are each high in the accuracy of dimensions, leading to a reduction in the frequency of occurrence of poor locking due to variations in dimensions. Note that the cross-sectional shape of each lock-engageable part 32 may be semicircular, circle-based arc-shaped, or ellipse-based arc-shaped, provided that each lock-engageable part 32 is engageable with the corresponding lock member 22 at least in the detachment direction of the functional expansion unit 20 (in the up direction in FIG. 3). Therefore, the term "U-shaped in cross section" herein means semicircular in cross section, circle-based arc-shaped in cross section, and ellipse-based arc-shaped in cross section, in addition to U-shaped.

As above, the attachment structure 9 according to the embodiment of the present disclosure enables an improvement in the attachability of the functional expansion unit 20, leading to easy attachment of the functional expansion unit 20. The improved attachability enables a reduction in the frequency of occurrence of poor attachment. Thus, the functional expansion unit 20 can be reliably attached, leading to an improvement in reliability.

For an improvement in attachability, as in the embodiment of the present disclosure, respective portions through which each lock member 22 and the corresponding positioning lock member 30 come in contact may be provided with the slopes 220 and 300 and respective portions through which each stopper 25 and the corresponding positioning lock member 30 come in contact may be provided with the slops 250 and 300 (refer to FIGS. 3, 5, and 6). In this case, with inhibition of a stuck state due to contact between members, the functional expansion unit 20 can be attached more smoothly, leading to a further improvement in attachability. As in the embodiment of the present disclosure, since the lock members 22 are each provided with the protruding knob 22*c*, the lock members 22 can be operated easily. Thus, due to easy unlocking of the locked state, the functional expansion unit 20 can be detached. Note that such a slope 220, 300, or 250 as above may be provided to at least one of the respective portions through which each lock member 22 and the corresponding positioning lock member 30 come in contact or the respective portions through which each stopper 25 and the corresponding positioning lock member 30 come in contact.

Attachment Structures According to Modifications

Next, attachment structures according to modifications of the present disclosure will be described. Note that, in the following modifications, descriptions of constituents the same as constituents in the above embodiment of the present disclosure will be omitted as appropriate and differences will be mainly described.

Modification 1

Figure 14:
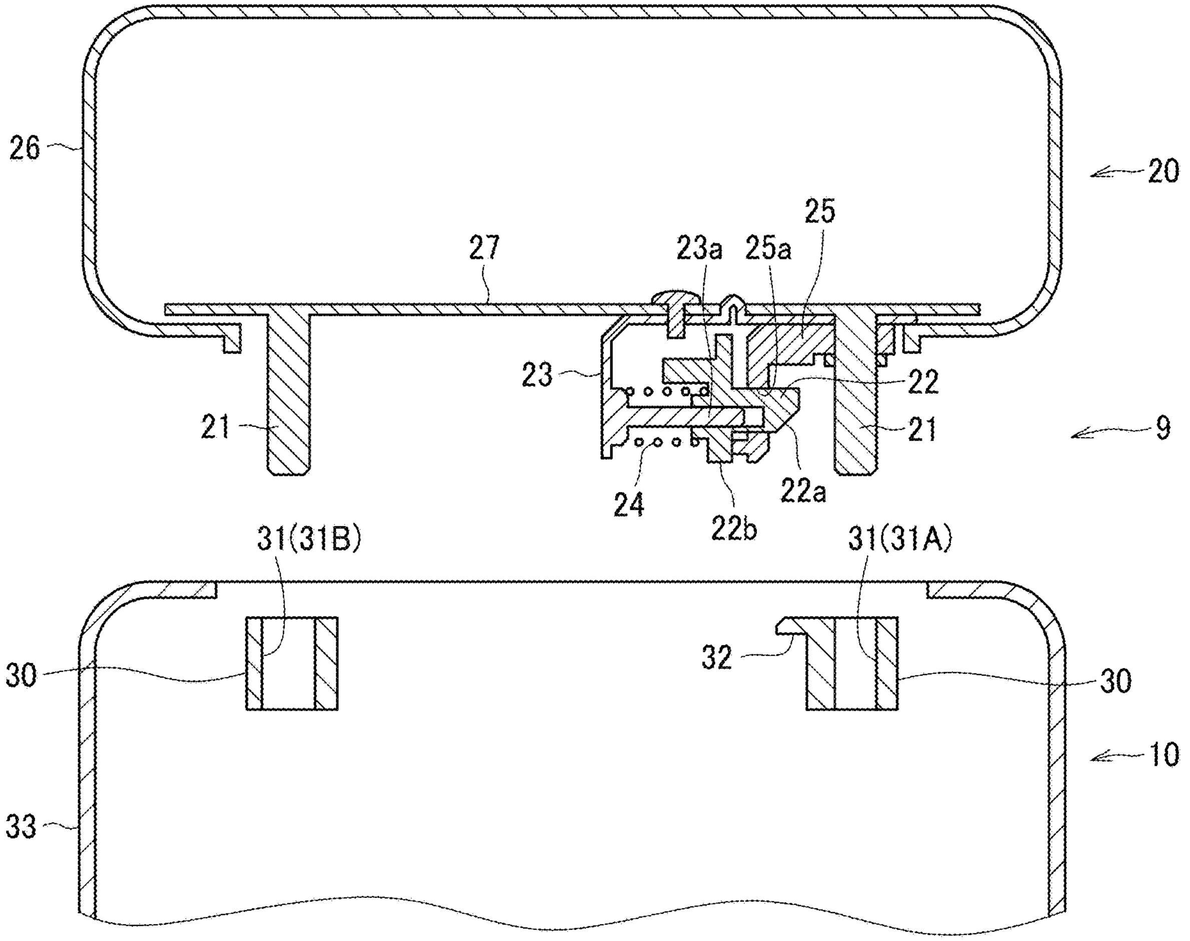
FIG. 14 is a cross-sectional view of a functional expansion unit and an operation panel, illustrating an attachment structure according to Modification 1 of the present disclosure.

FIG. 14 is a cross-sectional view of a functional expansion unit 20 and an operation panel 10, illustrating an attachment structure according to Modification 1 of the present disclosure.

In Modification 1 in FIG. 14, a single lock member 22 and a single lock-engageable part 32 are provided, instead of a pair of lock members 22 and a pair of lock-engageable part 32. Because of the single lock member 22, a single holder 23 that holds the lock member 22, a single spring 24 that presses the lock member 22, and a single stopper 25 that regulates movement of the lock member 22 are provided to the functional expansion unit 20.

As above, a single lock member 22 and a single lock-engageable part 32 may be provided. Even in such a case, due to engagement of the single lock member 22 with the single lock-engageable part 32, the functional expansion unit 20 can be prevented from being detached from the operation panel 10.

Figure 15:
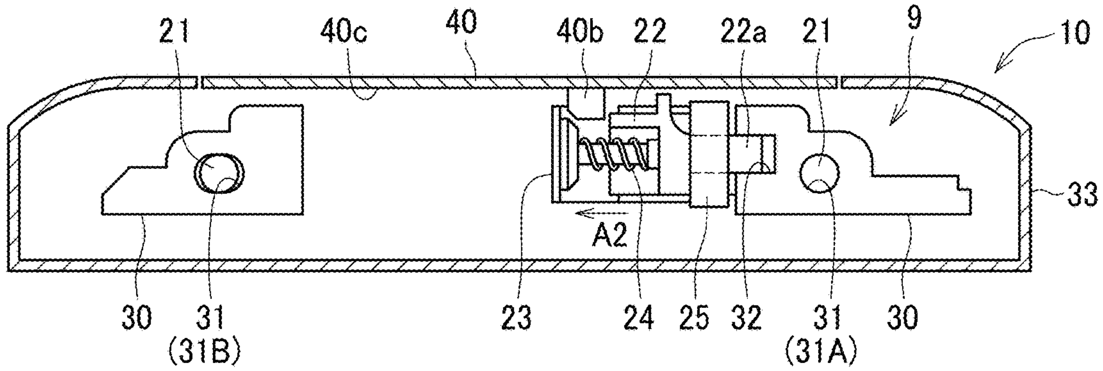
FIG. 15 is a cross-sectional view of the functional expansion unit and the operation panel to which a cover is attached, illustrating the attachment structure according to Modification 1 of the present disclosure.

For the single lock-engageable part 32, as in FIG. 15, a single unlock restricting part 40*b* may be provided. The single unlock restricting part 40*b* is located on the downstream side in an unlocking direction A2 of the lock member 22 and is disposed close to or in contact with the lock member 22, so that movement in the unlocking direction A2 of the lock member 22 can be regulated. Thus, the functional expansion unit 20 can be prevented from being detached improperly or unintendedly.

Note that, in Modification 1 illustrated in FIGS. 14 and 15, although the single lock member 22, lock-engageable part 32, and unlock restricting part 40*b* are provided on the main criterial side (on the side of location of a circular hole 31A), the single lock member 22, lock-engageable part 32, and unlock restricting part 40*b* may be provided on the secondary criterial side (on the side of location of an elongated hole 31B).

Modification 2

Figure 16:
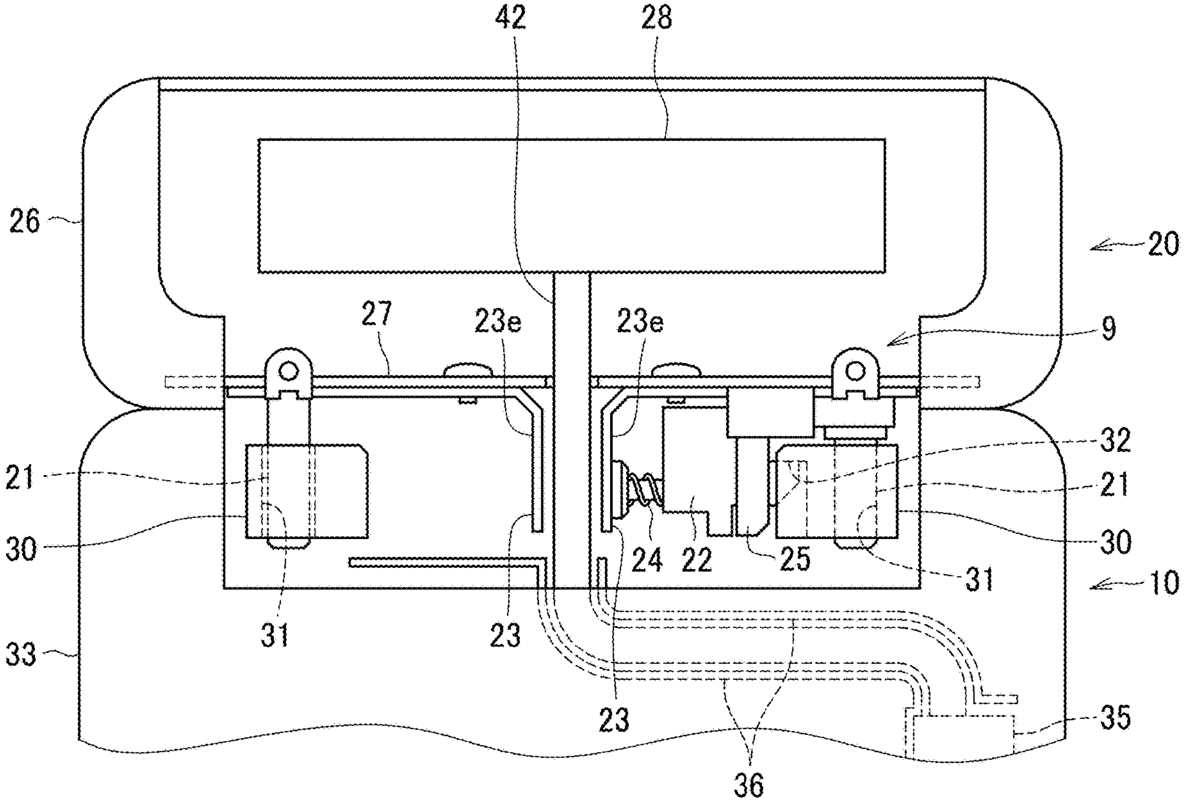
FIG. 16 is a schematic view of a functional expansion unit and an operation panel coupled through a wiring member, illustrating an attachment structure according to Modification 2 of the present disclosure.

FIG. 16 is a schematic view of a functional expansion unit 20 and an operation panel 10 coupled through a wiring member 42, illustrating an attachment structure according to Modification 2 of the present disclosure.

In Modification 2 in FIG. 16, a single lock member 22 is provided, like Modification 1 above. Although the single lock member 22 is provided, as in FIG. 16, two holders 23 may be provided and the wiring member 42 may be disposed between mutually facing extended parts 23*e* of the two holders 23.

In this case, even when a force acts to detach the functional expansion unit 20 forcedly, the wiring member 42 can inhibit the extended parts 23*e* from deforming to come close to each other. Thus, the locked state is unlikely to be unlocked. Note that the holder 23 not provided with the lock member 22 does not need to hold such a lock member 22. Thus, as in FIG. 16, a guide shaft 23*a* that holds a lock member 22 (refer to FIG. 4) may be omitted.

Modification 3

Figure 17:
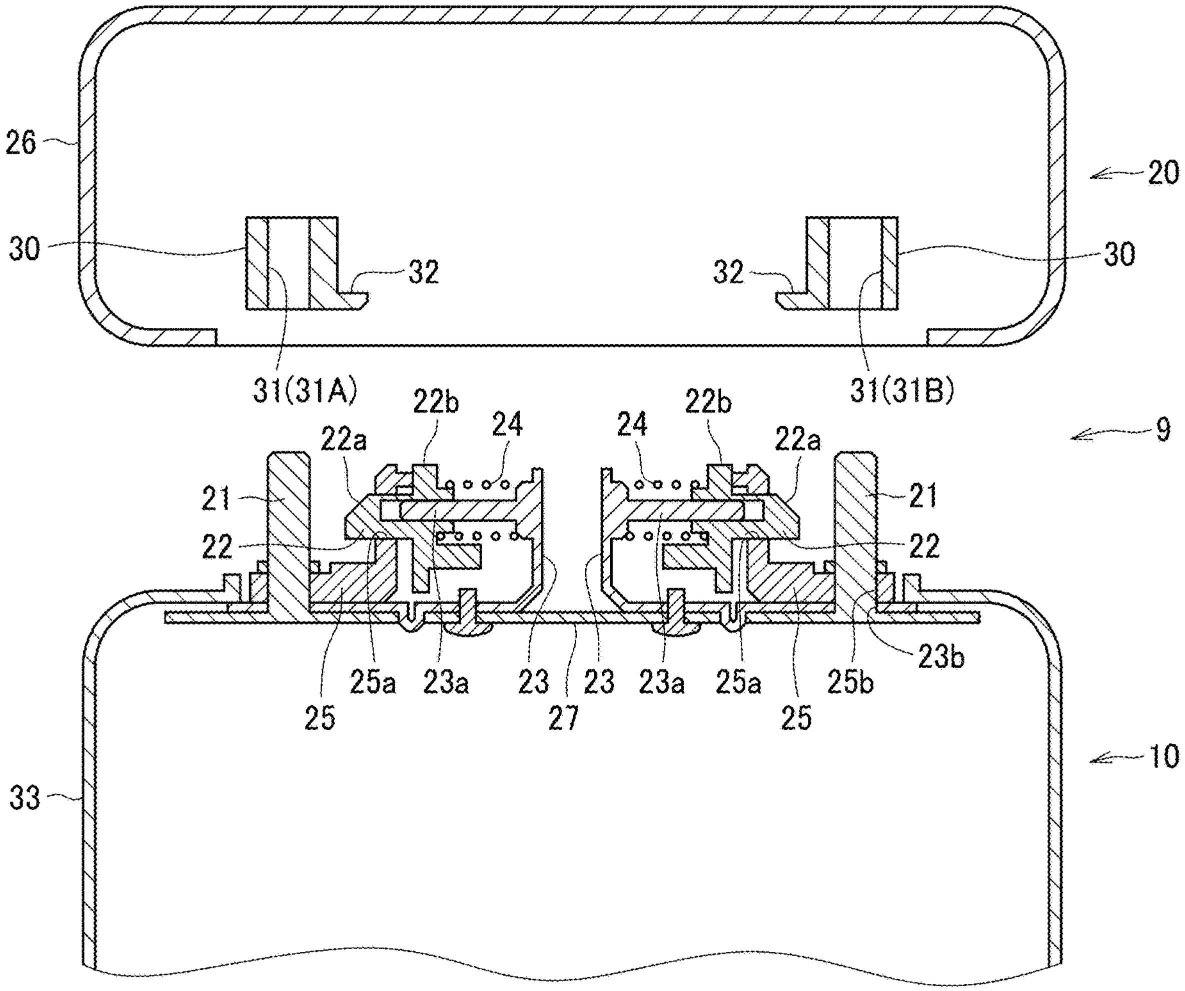
FIG. 17 is a cross-sectional view of a functional expansion unit and an operation panel, illustrating an attachment structure according to Modification 3 of the present disclosure.

FIG. 17 is a cross-sectional view of a functional expansion unit 20 and an operation panel 10, illustrating an attachment structure according to Modification 3 of the present disclosure.

In Modification 3 in FIG. 17, the arrangement of the members included in an attachment structure 9 is reverse to the arrangement of the members in the above embodiment of the present disclosure. That is, in Modification 3, the operation panel 10 is provided with a pair of positioning shafts 21, a pair of lock members 22, a pair of holders 23, a pair of springs 24, and a pair of stoppers 25. Meanwhile, the functional expansion unit 20 is provided with a pair of positioning lock members 30 each including a positioning hole 31 and a lock-engageable part 32.

In this case, in response to approach of the functional expansion unit 20 to the operation panel 10, the pair of positioning shafts 21 provided to the operation panel 10 are inserted one-to-one in the pair of positioning holes 31 provided to the functional expansion unit 20 and additionally the pair of lock members 22 provided to the operation panel 10 engage one-to-one with the pair of lock-engageable parts 32 provided to the functional expansion unit 20 to achieve a locked state. As above, such members to be provided to a functional expansion unit 20 and an operation panel 10 may be reverse in arrangement to the members in the above embodiment of the present disclosure. Note that, although the pair of lock members 22 and the pair of lock-engageable parts 32 are provided, instead of this, a single lock member 22 and a single lock-engageable part 32 may be provided on the main criterial side or secondary criterial side, like Modification 1 above (refer to FIG. 14). Referring to FIG. 17, the members, which are included in the attachment structure 9, provided to the operation panel 10 are each disposed protruding from a housing 33 and the members, which are included in the attachment structure 9, provided to the functional expansion unit 20 are each disposed in a unit body 26, but this is not limiting. Thus, the members, which are included in the attachment structure 9, provided to the operation panel 10 may be each disposed in the housing 33 and the members, which are included in the attachment structure 9, provided to the functional expansion unit 20 may be each disposed protruding from the unit body 26.

Figure 18:
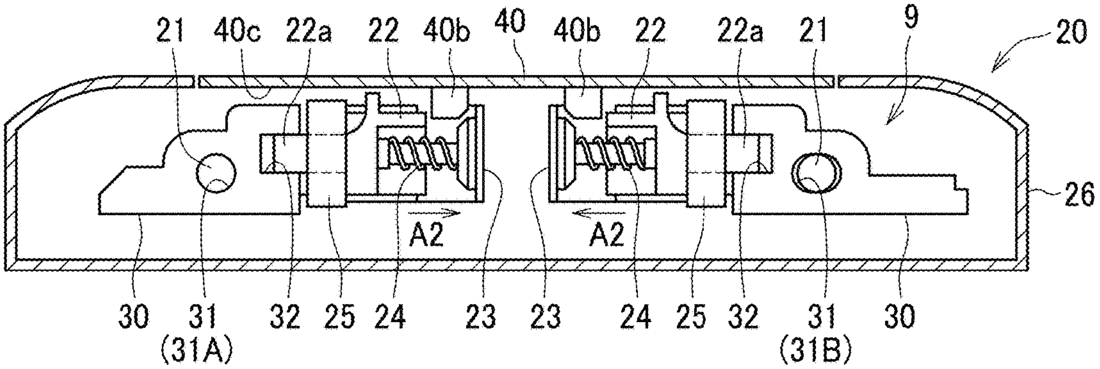
FIG. 18 is a cross-sectional view of the functional expansion unit and the operation panel to which a cover is attached, illustrating the attachment structure according to Modification 3 of the present disclosure.

As in FIG. 18, in Modification 3, a cover 40 that is attached to the functional expansion unit 20 and the operation panel 10 has an inner face 40*c* provided with a pair of unlock restricting parts 40*b*. Thus, movement in an unlocking direction A2 of each of the pair of lock members 22 can be regulated.

Thus, the functional expansion unit 20 can be prevented from being detached improperly or unintendedly.

Figure 19:
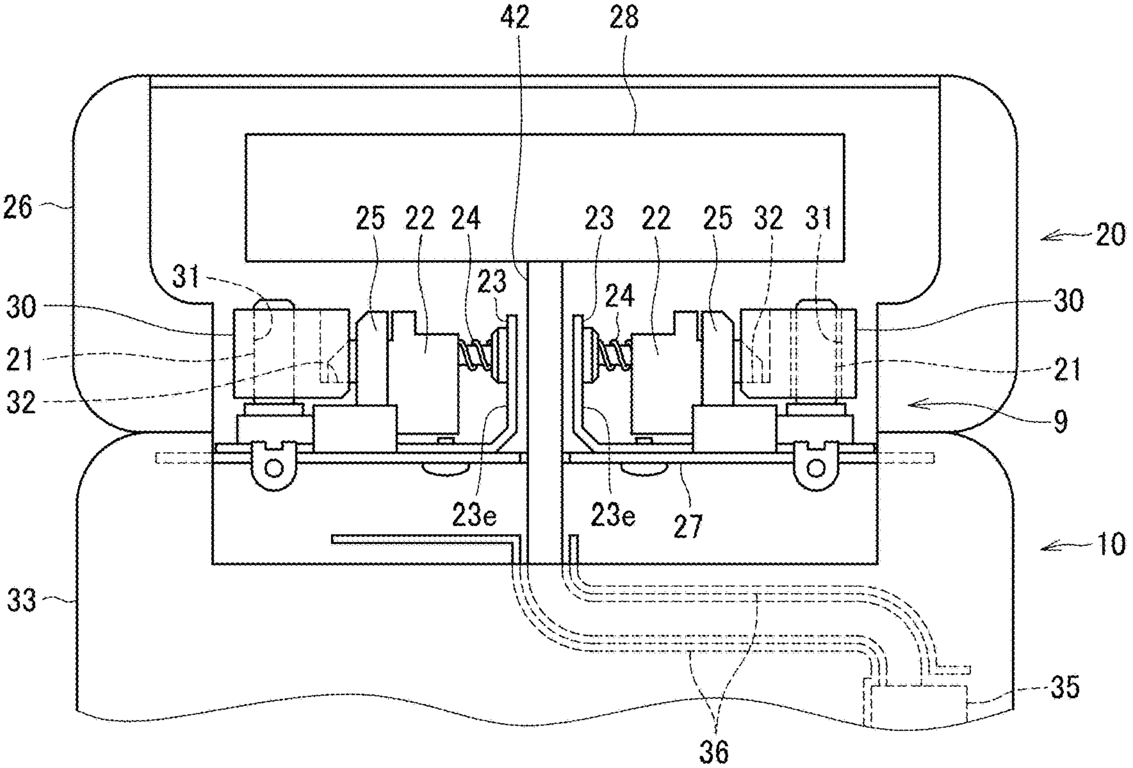
FIG. 19 is a schematic view of the functional expansion unit and the operation panel coupled through a wiring member, illustrating the attachment structure according to Modification 3 of the present disclosure.

As in FIG. 19, in Modification 3, a wiring member 42 that connects the functional expansion unit 20 and the operation panel 10 may be disposed between two holders 23. In this case, the wiring member 42 can inhibit the holders 23 from deforming to come close to each other. Thus, the locked state can be reliably prevented from being unlocked.

Modification 4

Figure 20:
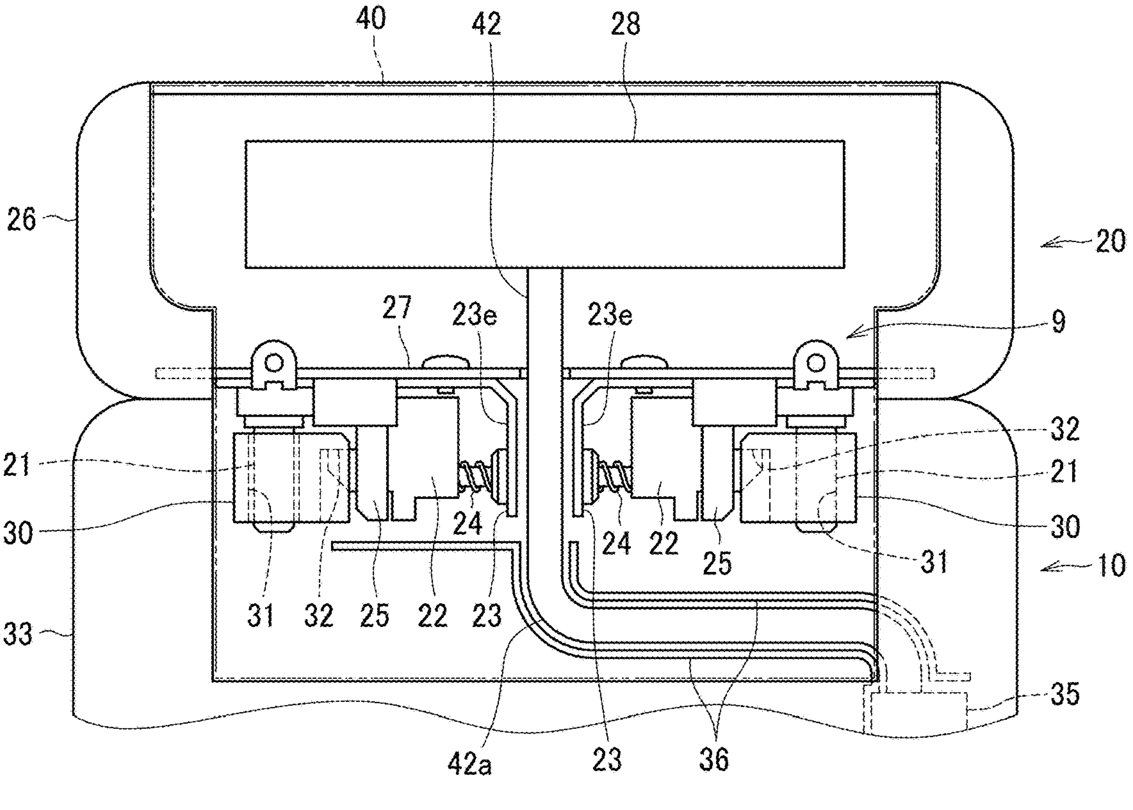
FIG. 20 is a schematic view of a functional expansion unit and an operation panel coupled through a wiring member covered with a cover, illustrating an attachment structure according to Modification 4 of the present disclosure.

FIG. 20 is a schematic view of a functional expansion unit 20 and an operation panel 10 coupled through a wiring member 42 covered with a cover 40, illustrating an attachment structure according to Modification 4 of the present disclosure.

In Modification 4 in FIG. 20, the cover 40 is attached such that the wiring member 42 has a bent part 42*a* covered with the cover 40.

In this case, even when the wiring member 42 is pulled together with the functional expansion unit 20 in response to pulling in the detachment direction of the functional expansion unit 20, the bent part 42*a* of the wiring member 42 is held by the cover 40 so as not to be taken out from a wiring path member 36. Thus, resistance can be reliably generated due to contact between the bent part 42*a* and the wiring path member 36 responsive to pulling of the wiring member 42, so that the functional expansion unit 20 can be prevented from being roughly pulled out. The configuration of such a cover 40 can be applied to such a configuration in which the members provided to the functional expansion unit 20 and the members provided to the operation panel 10 are replaced with each other as in FIG. 19.

Embodiments of the present disclosure have been described above with exemplary attachment structures that allow a functional expansion unit to be attached to an operation panel. An attachment structure according to an embodiment of the present disclosure can be applied to the attachment structure of a functional expansion unit to an electronic device, such as a personal computer (PC) or a tablet terminal, different from an operation panel. Application of an attachment structure according to an embodiment of the present disclosure to the attachment structure of a functional expansion unit to such an electronic device as above enables achievement of easy attachment and detachment of the functional expansion unit and prevention of improper or unintended detachment.

To summarize the aspects of the present disclosure described above, the present disclosure includes at least the following aspects.

Aspect 1

According to Aspect 1, provided is an attachment structure allowing a functional expansion unit to be attached to an electronic device, the attachment structure including: a pair of positioning shafts provided to the functional expansion unit; a pair of positioning holes provided to the electronic device, the pair of positioning holes allowing the pair of positioning shafts to be inserted in the pair of positioning holes; a lock provided to the functional expansion unit; a lock-engageable part provided to the electronic device, the lock-engageable part being engageable with the lock; a cover to cover the pair of positioning shafts, the pair of positioning holes, the lock, and the lock-engageable part; and an unlock restricting part provided on an inner face of the cover, the unlock restricting part being to regulate movement in an unlocking direction of the lock.

Aspect 2

According to Aspect 2, provided is an attachment structure allowing a functional expansion unit to be attached to an electronic device, the attachment structure including: a pair of positioning shafts provided to the electronic device; a pair of positioning holes provided to the functional expansion unit, the pair of positioning holes allowing the pair of positioning shafts to be inserted in the pair of positioning holes; a lock provided to the electronic device; a lock-engageable part provided to the functional expansion unit, the lock-engageable part being engageable with the lock; a cover to cover the pair of positioning shafts, the pair of positioning holes, the lock, and the lock-engageable part; and an unlock restricting part provided on an inner face of the cover, the unlock restricting part being to regulate movement in an unlocking direction of the lock.

Aspect 3

According to Aspect 3, the attachment structure of Aspect 1 or 2 further includes: a pair of holders holding a pair of locks movably in a locking direction and the unlocking direction crossing an axial direction of the pair of positioning shafts; and a wiring member to electrically connect the electronic device and the functional expansion unit, in which the lock includes the pair of locks, and the wiring member is disposed between the pair of holders such that the wiring member has contact with the pair of holders in a case where the pair of holders come close to each other to deform.

Aspect 4

According to Aspect 4, in the attachment structure of Aspect 3, the wiring member includes a bent part along a wiring path member provided to a housing of the electronic device.

Aspect 5

According to Aspect 5, in the attachment structure of any one of Aspects 1 to 4, the lock-engageable part includes a groove to engage with the lock at least in a detachment direction of the functional expansion unit.

Aspect 6

According to Aspect 6, the attachment structure of any one of Aspects 1 to 5 further includes: a holder holding the lock movably in a locking direction and the unlocking direction; a spring pressing the lock in the locking direction; and a stopper regulating movement in the locking direction of the lock, in which the holder and the stopper each have a shaft insertion hole through which one of the pair of positioning shafts is inserted, and the shaft insertion hole has an inner circumferential face in contact with an outer circumferential face of the one of the pair of positioning shafts.

Aspect 7

According to Aspect 7, in the attachment structure of any one of Aspects 1 to 6, the lock and the lock-engageable part have respective portions that come in contact with each other in response to attachment of the functional expansion unit to the electronic device, the stopper and the lock-engageable part have respective portions that come in contact with each other in response to attachment of the functional expansion unit to the electronic device, at least one of the respective portions of the lock and the lock-engageable part or one of the respective portions of the stopper and the lock-engageable part is provided with a slope inclined with respect to an attachment direction of the functional expansion unit.

Aspect 8

According to Aspect 8, in the attachment structure of any one of Aspects 1 to 7, the lock includes a protruding knob.

Aspect 9

According to Aspect 9, in the attachment structure of any one of Aspects 1 to 8, the unlock restricting part protrudes from the inner face of the cover and is annular in shape.

Aspect 10

According to Aspect 10, in the attachment structure of Aspect 4, the cover covers at least the bent part of the wiring member.

Aspect 11

According to Aspect 11, an electronic device includes the attachment structure of any one of Aspects 1 to 10 for attachment of a functional expansion unit.

Aspect 12

According to Aspect 12, an image forming apparatus includes the attachment structure of any one of Aspects 1 to 10 for attachment of a functional expansion unit.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The invention claimed is:

1. An attachment structure comprising:

a positioning shaft of a functional expansion unit attachable to an electronic device;

a lock member of the functional expansion unit;

a positioning hole, into which the positioning shaft of the functional expansion unit is insertable in an attachment direction, in the electronic device;

a lock-engageable part of the electronic device, the lock-engageable part engageable with the lock member; and a cover to cover the positioning shaft, the positioning hole, the lock member, and lock-engageable part, the cover including a lock restricting part on an inner face thereof, the lock restricting part to restrict movement of the lock member in an unlocking direction.

2. The attachment structure according to claim 1, further comprising:

a pair of lock members including the lock member;

a pair of holders respectively holding the pair of lock members movable in a locking direction opposite to the unlocking direction and intersecting the attachment direction; and a wiring member electrically connecting the electronic device with the functional expansion unit, wherein the wiring member is disposed between the pair of holders.

3. The attachment structure according to claim 2, wherein the electronic device includes a wiring path member in a housing of the electronic device, and the wiring member is bent along the wiring path member in the housing of the electronic device.

4. The attachment structure according to claim 3, wherein the cover covers at least a bent part of the wiring member.

5. The attachment structure according to claim 1, wherein the lock-engageable part has a groove engageable with the lock member.

6. The attachment structure according to claim 1, further comprising:

a holder holding the lock member movable in the unlocking direction and a locking direction opposite to the unlocking direction and intersecting the attachment direction, the holder having a first shaft insertion hole through which the positioning shaft is inserted;

a spring pressing the lock member in the locking direction; and a stopper to restrict movement of the lock member in the locking direction, the stopper having a second shaft insertion hole through which the positioning shaft is inserted, wherein each of the first shaft insertion hole and the second shaft insertion hole has an inner circumferential face to contact an outer circumferential face of the positioning shaft.

7. The attachment structure according to claim 1, further comprising:

a stopper to restrict movement of the lock member in a locking direction opposite to the unlocking direction; and a positioning lock member including the positioning hole and the lock-engageable part, wherein at least one of:

a portion where the lock member contacts the positioning lock member; or a portion where the stopper contacts the positioning lock member has a slope inclined with the attachment direction.

8. The attachment structure according to claim 1, wherein the lock member includes a protruding knob.

9. The attachment structure according to claim 1, wherein the lock restricting part includes an annular projection protruding from the inner face of the cover.

10. An electronic device comprising the attachment structure according to claim 1 to allow the functional expansion unit to be attached to the electronic device.

11. An image forming apparatus comprising the attachment structure according to claim 1 to allow the functional expansion unit to be attached to the electronic device.

12. An attachment structure comprising:

a positioning shaft of an electronic device;

a lock member of the electronic device;

a positioning hole into which the positioning shaft of the electronic device is insertable in an attachment direction in a functional expansion unit attachable to an electronic device;

a lock-engageable part of the functional expansion unit, the lock-engageable part engageable with the lock member; and a cover to cover the positioning shaft, the positioning hole, the lock member, and lock-engageable part, the cover including a lock restricting part on an inner surface thereof, the lock restricting part to restrict movement of the lock member in an unlocking direction.

* * * * *